(12) United States Patent
Gowda et al.

(10) Patent No.: US 11,209,714 B2
(45) Date of Patent: Dec. 28, 2021

(54) RADIO FREQUENCY PASSBAND SIGNAL GENERATION USING PHOTONICS

(71) Applicant: Lawrence Livermore National Security, LLC, Livermore, CA (US)

(72) Inventors: Apurva Shantharaj Gowda, Mountain View, CA (US); Jacky Chak-Kee Chan, Livermore, CA (US); Peter Thomas Setsuda DeVore, Livermore, CA (US); David Simon Perlmutter, Oakland, CA (US); Jason Thomas Chou, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 27 days.

(21) Appl. No.: 16/751,839

(22) Filed: Jan. 24, 2020

(65) Prior Publication Data

US 2021/0018814 A1    Jan. 21, 2021

Related U.S. Application Data

(60) Provisional application No. 62/875,376, filed on Jul. 17, 2019, provisional application No. 62/876,242, filed on Jul. 19, 2019.

(51) Int. Cl.
*H04B 10/04* (2006.01)
*G02F 1/21* (2006.01)
(Continued)

(52) U.S. Cl.
CPC .................. *G02F 1/21* (2013.01); *G02B 5/20* (2013.01); *G02F 1/0123* (2013.01); *H04J 14/08* (2013.01); *G02F 1/212* (2021.01)

(58) Field of Classification Search
CPC .......... H04B 10/2575; H04B 10/25753; H04B 10/532; H04B 10/541; H04B 10/548;
(Continued)

(56) References Cited

U.S. PATENT DOCUMENTS 4,709,978 A    12/1987 Jackel
5,148,503 A     9/1992 Skeie
(Continued)

OTHER PUBLICATIONS

Abo, M., A., et al., "A 1.5-V, 10-bit, 14.3-MS/s CMOS Pipeline Analog-to-Digital Converter," IEEE Journal of Solid-State Circuits, vol. 34, No. 5, May 1999.
(Continued)

*Primary Examiner* — Hanh Phan
(74) *Attorney, Agent, or Firm* — Perkins Coie LLP

(57) ABSTRACT

Devices, methods and systems for generating wideband, high-fidelity arbitrary radio frequency (RF) passband signals are described. A voltage tunable optical filter for arbitrary RF passband signal generation includes a first input configured to receive a broadband optical pulse train, a second input configured to receive a first control voltage representative of an amplitude signal, an electrooptic modulator to receive the broadband optical pulse train and the first control voltage, to modulate the broadband optical pulse train in accordance with the amplitude signal, and to produce two complementary optical outputs that form two arms of an interferometer, an optical delay component to impart an optical path difference into one of the complementary outputs of the electrooptic modulator, and a combiner or a splitter to receive two complementary optical outputs of the electrooptic modulator after impartation of the optical path difference and to produce an output interference pattern of fringes.

21 Claims, 35 Drawing Sheets

(51) Int. Cl.
*H04J 14/08* (2006.01)
*G02F 1/01* (2006.01)
*G02B 5/20* (2006.01)

(58) Field of Classification Search
CPC ........ H04B 10/66; H04B 10/67; H04B 10/69; H04J 14/06; G02F 1/21; G02F 1/0123
USPC ........ 398/115, 116, 117, 183, 184, 186, 188, 398/201, 65, 152, 161, 202, 208, 212, 398/214; 359/245, 237, 238, 239, 248; 341/137, 155, 144
See application file for complete search history.

(56) References Cited

U.S. PATENT DOCUMENTS

| | | | |
|---|---|---|---|
| 5,249,243 | A | 9/1993 | Skeie |
| 5,408,544 | A | 4/1995 | Seino |
| 6,671,298 | B1 | 12/2003 | Delfyett et al. |
| 6,724,783 | B2 | 4/2004 | Jalali et al. |
| 7,133,135 | B2 | 11/2006 | Dorrer |
| 7,209,664 | B1 | 4/2007 | Mcnicol et al. |
| 7,259,901 | B2 | 8/2007 | Parsons et al. |
| 7,522,842 | B1 | 4/2009 | Mcnicol et al. |
| 7,587,144 | B2 * | 9/2009 | Ilchenko ................. G02F 1/011 398/183 |
| 7,787,779 | B2 | 8/2010 | Weiner et al. |
| 7,868,799 | B1 | 1/2011 | Price et al. |
| 7,877,020 | B1 | 1/2011 | Hayes et al. |
| 7,940,380 | B1 | 5/2011 | Benner |
| 8,164,819 | B2 | 4/2012 | Tu et al. |
| 8,442,402 | B1 | 5/2013 | Zanoni et al. |
| 8,446,305 | B1 | 5/2013 | Zanoni et al. |
| 8,456,336 | B1 | 6/2013 | Zanoni et al. |
| 8,478,132 | B1 | 7/2013 | Jepsen et al. |
| 8,548,331 | B1 | 10/2013 | Zanoni et al. |
| 8,779,955 | B1 | 7/2014 | Zanoni et al. |
| 8,934,058 | B2 | 1/2015 | Chou et al. |
| 8,965,211 | B1 | 2/2015 | Zanoni et al. |
| 9,077,455 | B2 | 7/2015 | Randel et al. |
| 9,118,423 | B1 | 8/2015 | Zanoni et al. |
| 9,197,471 | B1 | 11/2015 | Zanoni et al. |
| 9,356,704 | B1 | 5/2016 | Zanoni et al. |
| 9,645,291 | B1 | 5/2017 | Sommer et al. |
| 9,843,398 | B1 | 12/2017 | Zanoni et al. |
| 9,857,660 | B1 | 1/2018 | Devore et al. |
| 9,888,303 | B1 | 2/2018 | Jepsen et al. |
| 10,063,320 | B2 | 8/2018 | Clark et al. |
| 10,069,619 | B1 | 9/2018 | Zanoni et al. |
| 10,075,154 | B1 | 9/2018 | Hsieh |
| 2003/0058499 | A1 | 3/2003 | Reingand et al. |
| 2004/0085620 | A1 | 5/2004 | Kawanishi et al. |
| 2007/0140705 | A1 | 6/2007 | Shpantzer et al. |
| 2007/0273958 | A1 | 11/2007 | Hirooka et al. |
| 2008/0212166 | A1 | 9/2008 | Lett et al. |
| 2010/0209121 | A1 | 8/2010 | Tanimura |
| 2011/0097085 | A1 | 4/2011 | Oda et al. |
| 2011/0129230 | A1 | 6/2011 | Zanoni et al. |
| 2011/0141478 | A1 | 6/2011 | Sasaki et al. |
| 2012/0069854 | A1 | 3/2012 | Suzuki |
| 2012/0148264 | A1 | 6/2012 | Liu et al. |
| 2012/0212360 | A1 | 8/2012 | Kanter et al. |
| 2012/0213532 | A1 | 8/2012 | Hironishi et al. |
| 2012/0263456 | A1 | 10/2012 | Tanaka et al. |
| 2012/0274937 | A1 | 11/2012 | Hays et al. |
| 2012/0288286 | A1 | 11/2012 | Houtsma et al. |
| 2013/0062508 | A1 | 3/2013 | Kanter et al. |
| 2013/0209089 | A1 | 8/2013 | Harley et al. |
| 2014/0233963 | A1 | 8/2014 | Le Taillandier De Gabory |
| 2015/0016827 | A1 | 1/2015 | Wilkinson et al. |
| 2015/0110494 | A1 * | 4/2015 | Ghelfi .................... H04B 10/00 398/115 |
| 2015/0207567 | A1 * | 7/2015 | Bogoni .................. H04B 10/40 398/115 |
| 2017/0250776 | A1 | 8/2017 | Morsy-osman et al. |
| 2018/0294946 | A1 | 10/2018 | Sinclair et al. |
| 2019/0072833 | A1 | 3/2019 | Nejadriahi et al. |
| 2019/0097734 | A1 | 3/2019 | Inagaki et al. |
| 2021/0021914 | A1 | 1/2021 | Perlmutter et al. |

OTHER PUBLICATIONS

Bao, X., et al., "Recent Progress in Distributed Fiber Optic Sensors," Sensors 2012, 12, 8601-8639.
Batagelj, B., et al., "Key Properties and Design Issues for an Opto-Electronic Oscillator," ICTON 2015.
Burns, K., W., et al., "Second Harmonic Generation in Field Poled, Quasi-Phase-Matched, Bulk LiNbO3," IEEE Photonics Technology Letters, vol. 6. No. 2, Feb. 1994.
Chen, Y., K., et al., "Integrated Photonic Digital-to-Analog Converter for Arbitrary Waveform Generation," Bell Laboratories, Alcatel-Lucent, 600 Mountain Avenue, New Jersey, U.S.A., 2019.
Davari, B., et al., "CMOS Scaling for High Performance and Low Power-The Next Ten Years," Proceedings of the IEEE, vol. 83, No. 4, Apr. 1995.
De La Rosa, E., et al., "All-fiber absolute temperature sensor using an unbalanced high-birefringence Sagnac loop," Optics Letters, vol. 22, No. 7, Apr. 1, 1997.
Devore, S., T., P., et al., "Enhancing electrooptic modulators using modulation instability," Phys. Status Solidi RRL 7, No. 8 (2013).
Devore, S., T., P., et al., "Light-weight flexible magnetic shields for large-aperture photomultiplier tubes," Nuclear Instruments and Methods in Physics Research A 737(2014) 222-228.
Devore, S., T., P., et al., "Near-field and complex-field time-stretch transform," Proc, of SPIE vol. 9141, 2014.
Devore, S., T., P., et al., "Rogue events and noise shaping in nonlinear silicon photonics," Journal of Optics 15, 2013.
Devore, S., T., P., et al., "Stimulated supercontinuum generation extends broadening limits in silicon," Appl. Phys. Lett. 100, 101111 (2012).
Devore, S., T., P., et al., Coherent Time-Stretch Transform for Near-Field Spectroscopy, IEEE Photonics Journal, vol. 6, No. 2, Apr. 2014.
Dumin, J., D., et al., "Oxide Wearout, Breakdown, and Reliability," International Journal of High Speed Electronics and Systems, vol. 11, No. 3 (2001) 617-718.
Eickhoff, W., "Temperature sensing by mode-mode interference in birefringent optical fibers," Optics Letters, vol. 6, No. 4, Apr. 1981.
Eliyahu, D., et al., "Tunable, Ultra-Low Phase Noise YIG Based Opto-Electronic Oscillator," IEEE MTT-S Digest, 2003.
Fard, M., A., et al., "Impact of Optical Nonlinearity on Performance of Photonic Time-Stretch Analog-to-Digital Converter," Journal of Lightwave Technology, vol. 29, No. 13, Jul. 1, 2011.
Fortier, M., T., "Generation of ultrastable microwaves via optical frequency division," Nature Photonics, vol. 5, Jul. 2011.
Fortier, M., T., et al., "Optically referenced broadband electronic synthesizer with 15 digits of resolution," Laser Photonics Rev. 10, No. 5, 780-790 (2016).
Gee, M., C., et al., "Spurious-Free Dynamic Range of a High-Resolution Photonic Time-Stretch Analog-to-Digital Converter System," Microwave and Optical Technology Letters, vol. 54, No. 11, Nov. 2012.
Gee, M., C., et al., Spurious-Free Dynamic Range of a High-Speed Photonic Time-Stretch A/D-Converter System, Advanced Photonics Congress © 2012.
Gregers-Hansen, V., et al., "A Stacked A-to-D Converter for Increased Radar Signal Processor Dynamic Range," Radar Division, Naval Research Laboratory Washington, DC 20375, 2019.
Ikeda, K., et al., "Optical quantizing and coding for ultrafast A/D conversion using nonlinear fiber-optic switches based on Sagnac interferometer," May 30, 2005, vol. 13, No. 11, Optics Express 4297.
Jiang, Y., et al., "Analog optical computing primitives in silicon photonics," Optics Letters, vol. 41, No. 6, Mar. 2016.
Jung, K., et al., "All-fibre photonic signal generator for attosecond timing and ultralow-noise microwave," Scientific Reports, 5:16250, DOI: 10.1038/srep16250, 2015.

(56) References Cited

OTHER PUBLICATIONS

Juodawlkis, W., P., et al., "Optically Sampled Analog-to-Digital Converters," IEEE Transactions on Microwave Theory and Techniques, vol. 49, No. 10, Oct. 2001.

Kim., H., et al., "Sub-20-Attosecond Timing Jitter Mode-Locked Fiber Lasers," IEEE Journal of Selected Topics in Quantum Electronics, vol. 20, No. 5, Sep./Oct. 2014.

Kitayama, K., et al., "Ultrafast All-Optical Analog-to-Digital Conversion using Fiber Nonlinearity," ECOC 2009, Sep. 20-24, 2009, Vienna, Austria.

Liao, J., et al., "Novel Photonic Radio-frequency Arbitrary Waveform Generation based on Photonic Digital-to-Analog Conversion with Pulse Carving," Department of Electronic Engineering, Tsinghua University, Beijing, I 00084, China, 2019.

Linde, D., et al., "Characterization of the Noise in Continuously Operating Mode-Locked Lasers," Appl. Phys. B 39, 201-217 (1986).

Luennemann, M., et al., "Electrooptic properties of lithium niobate crystals for extremely high external electric fields," Appl. Phys. B 76, 403-406 (2003).

Miyoshi, Y., et al., "Multiperiod PM-NOLM With Dynamic Counter-Propagating Effects Compensation for 5-Bit All-Optical Analog-to-Digital Conversion and Its Performance Evaluations," Journal of Lightwave Technology, vol. 28, No. 4, Feb. 15, 2010.

Miyoshi, Y., et al., "Performance Evaluation of Resolution-Enhanced ADC Using Optical Multiperiod Transfer Functions of NOLMs," IEEE Journal of Selected Topics in Quantum Electronics, vol. 18, No. 2, Mar./Apr. 2012.

Moazzami, R., et al., "Projecting Gate Oxide Reliability and Optimizing Reliability Screens," IEEE Transactions on Electron Devices. vol. 37. No. 7. Jul. 1990.

Reilly, R., D., et al., "Undersampling a photonic analog-to-digital converter containing an optical hybrid combiner," Optics Communications 288 (2013) 31-37.

Robinson, R., "Polarization modulation and splicing techniques for stressed birefringent fiber," Rochester Institute of Technology RIT Scholar Works, Thesis/Dissertation Collections, Jan. 1995.

Rodwell, W., J., M., et al., "Subpicosecond Laser Timing Stabilization," IEEE Journal of Quantum Electronics, vol. 25, No. 4. Apr. 1989.

Sherman, A., et al., "Optical under-sampling by using a broadband optical comb with a high average power," Optical Society of America, Jun. 2014, vol. 22.

Wei, J., et al., "All-fiber-photonics-based ultralow-noise agile frequency synthesizer for X-band radars," vol. 6, No. 1 / Jan. 2018 / Photonics Research.

Xiao, J., et al., "High-Frequency Photonic Vector Signal Generation Employing a Single Phase Modulator," IEEE Photonics Journal, vol. 7, No. 2, Apr. 2015.

Xie, X., et al., "Photonic microwave signals with zeptosecond-level absolute timing noise," Nature Photonics, vol. 11, Jan. 2017.

Yao, S., X., et al., "Converting light into spectrally pure microwave oscillation," Optics Letters, vol. 21, No. 7, Apr. 1996.

Yao, S., X., et al., "Optoelectronic Oscillator for Photonic Systems," IEEE Journal of Quantum Electronics, vol. 32, No. 7, Jul. 1996.

Zhou, D., et al., "Single-shotBOTDA based on an optical chirp chain probe wave for distributed ultrafast measurement," Light: Science & Applications (2018) 7:32, Official journal of the CIOMP 2047-7538.

Zou, W., et al., "One-laser-based generation/detection of Brillouin dynamic grating and its application to distributed discrimination of strain and temperature," Optics Express 2363, vol. 19, No. 3, Jan. 2011.

International Searching Authority, International Search Report and Written Opinion, PCT Patent Application PCT/US2020/042422, dated Nov. 17, 2020, 8 pages.

Kazovsky, "All-fiber 900 optical hybrid for coherent communications." Applied Optics, vol. 26, No. 3, Feb. 1987.

\* cited by examiner

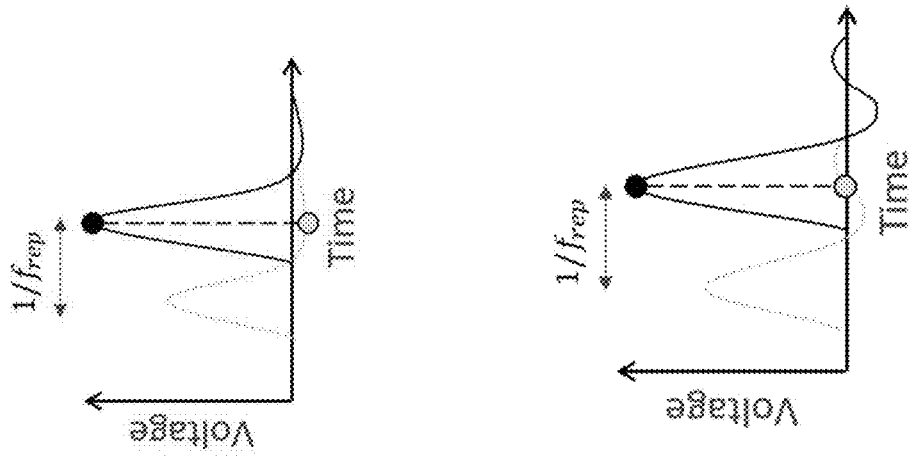
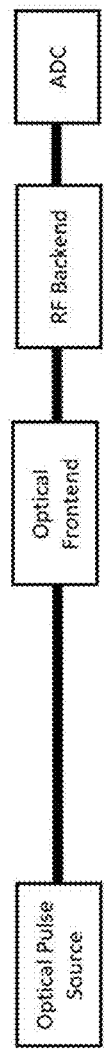
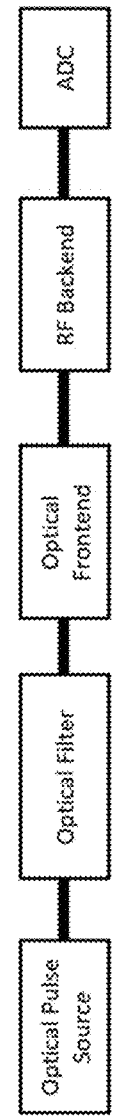
FIG. 7A
FIG. 7B

RADIO FREQUENCY PASSBAND SIGNAL GENERATION USING PHOTONICS

CROSS-REFERENCE TO RELATED APPLICATIONS

This patent document claims priority to and benefits of U.S. Provisional Patent Application No. 62/875,376 entitled "RADIO FREQUENCY PASSBAND SIGNAL GENERATION USING PHOTONICS," filed on Jul. 17, 2019, and U.S. Provisional Patent Application No. 62/876,242 entitled "ELECTRONIC DEMODULATION OF OPTICALLY PHASE DEMODULATED SIGNALS," filed on Jul. 19, 2019. The entire contents of the before-mentioned patent applications are incorporated by reference as part of the disclosure of this patent document.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

This patent document is directed generally to radio frequency (RF) signal generation, and more particularly, RF passband signal generation using photonics.

BACKGROUND

Radio frequency (RF) signal generators are used for testing components, receivers and test systems in a wide variety of applications including cellular communications, WiFi, WiMAX, GPS, audio and video broadcasting, satellite communications, radar and others.

With the advent of digital communications systems, the vector signal generator (VSG) has replaced traditional analog signal generators. VSGs are capable of generating digitally-modulated radio signals that may use any of a large number of digital modulation formats such as QAM, QPSK, FSK, BPSK, and OFDM.

SUMMARY

Embodiments of the disclosed technology relate to methods, devices and systems for generating wideband, high fidelity arbitrary RF passband signals. The disclosed embodiments can, for example, be used in many fields such as scientific diagnostics, radar, remote sensing, communications and quantum computing that utilize or can benefit from RF waveforms.

One aspect of the disclosed embodiments relates to an apparatus and method for generating arbitrary RF waveforms at passband using photonics. In some embodiments, an interferometric technique is used to create fringes in the optical spectrum. The fringe is mapped to time through wavelength-to-time mapping, thus creating an RF modulated pulse upon photodetection, the frequency of which is controllable. This advantageously allows concentration of the optical power in bands of interest, thus boosting signal-to-noise-ratio. In some embodiments, the phase and amplitude of each RF modulated pulse is controlled using two electronic voltage level generators, one to shift the fringe of the interference pattern created in the optical spectrum and the other to change its extinction ratio. A filter after opto-electric conversion can be used to interpolate the pulses to create an arbitrary wideband RF passband signal.

In some embodiments, multiplexing multiple of these optical channels linearly increases the modulation bandwidth. In other embodiments, multiple electronic voltage level generators can be stacked optically to reduce the noise of the system through incoherent averaging. An additional benefit of this method, amongst others, is the suppression of phase noise from the electronic voltage level generators through short optical pulse sampling. In yet other embodiments, since the signal generation is photonic, the RF signal can easily be transported over long distances and in bulk, through optical fiber, thus eliminating crosstalk and allowing for low power remote transmission units.

BRIEF DESCRIPTION OF THE DRAWINGS

FIG. 7A is a block diagram representation of an example of spectral pulse shaping subsystem.

FIG. 7B is a block diagram representation of another example of a spectral pulse shaping subsystem.

DETAILED DESCRIPTION

Figure 1:
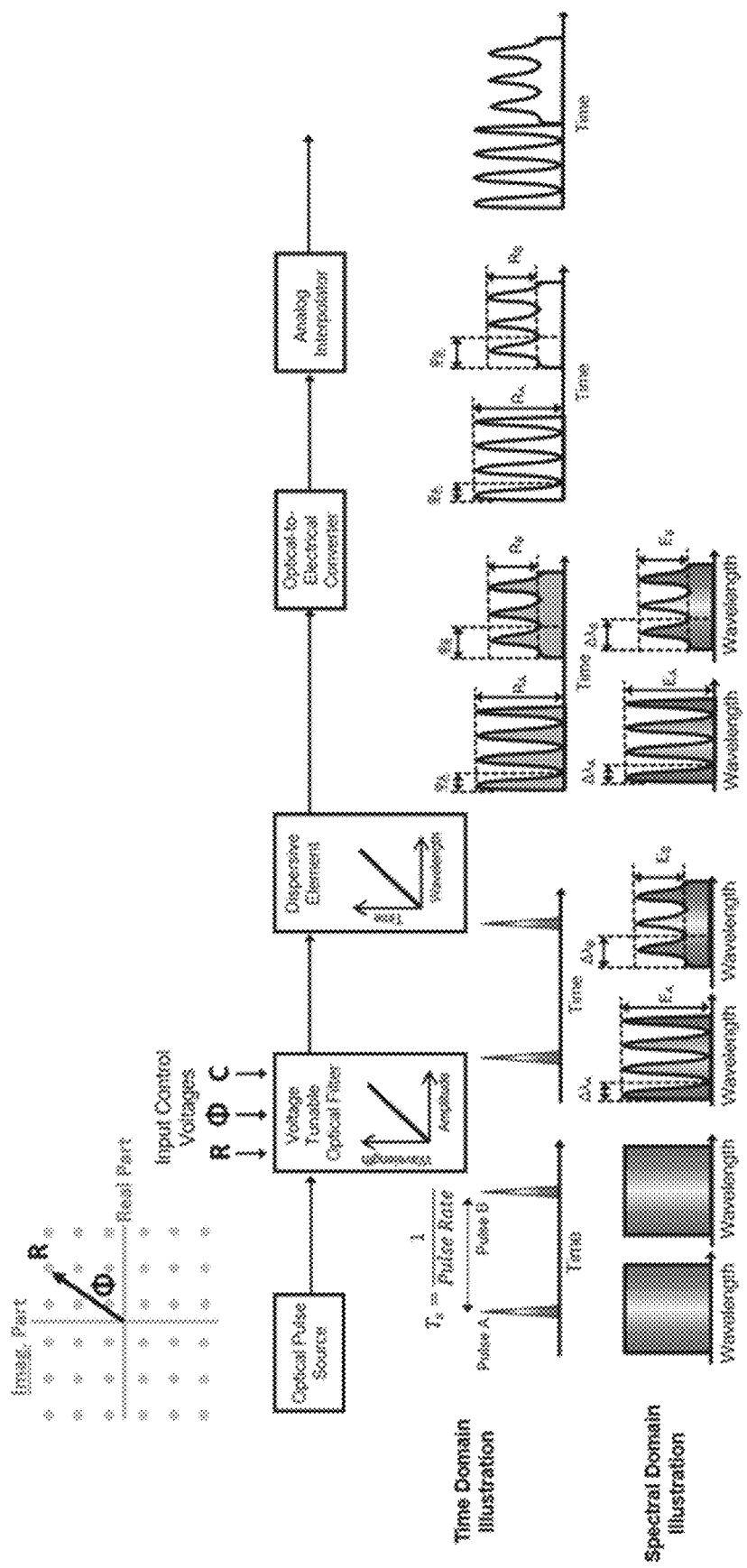
FIG. 1 is a schematic illustration of a system including components for generating arbitrary RF passband signals and the signal evolution in an example embodiment of the disclosed technology.

Embodiments of the disclosed technology relate to the field of wideband, high-fidelity modulated Radio Frequency (RF) signal generation, specifically to RF Vector Signal Generators (VSGs) and direct digital synthesis using wideband electronic Digital-to-Analog Converters (eDACs). Traditional, electronics-based RF signal generators typically suffer from multiple noise and distortion sources that limit their performance, such as thermal noise, clock jitter, local oscillator phase noise and mixer non-idealities.

In some existing systems, mixer-based RF signal generation approaches have been implemented that use two eDACs, a mixer and a microwave generator. This approach is typically used for targeted frequencies and large output voltages, but the signal fidelity is limited by mixer issues, such as amplitude and phase imbalances, timing skews, mixer non-linearities, local oscillator leak-through. These hardware non-idealities can be compensated and corrected for to a certain extent but require a series of calibration operations that can be time consuming, add to the complexity and cost of the system and may not produce a practical solution in many applications. For high channel count systems, such as quantum computing, scalability can be an issue considering each channel requires three components and individual calibration. Synchronization is also an issue with large channel counts. The approach is not well suited for applications where frequency band of interest is not well defined.

In other examples of the existing systems that employ direct synthesis using wideband eDACs, multiple RF signals at different frequencies can be generated on one channel. Predistortion is simpler and signal generation is more flexible to frequency requirements. However, for wideband eDACs, clock jitter is particularly important since the effective noise scales linearly with the signal's center frequency. This phase noise can manifest as amplitude noise in some applications. In the case of quantum computing, for example, these phase fluctuations are indistinguishable from the dephasing of the qubit. Another limitation of the direct synthesis approach is the limited dynamic range due to limited output voltages and resolution. Electronic DAC performance typically drops (and cost goes up) drastically with larger bandwidths. For example, a typical mid-tier DAC chip with a bandwidth of 3 GHz is capable of ~10.5 effective number of resolution bits and costs $300, whereas a 45 GHz commercial arbitrary wave generator (AWG) provides only ~5.5 effective number of bits costs greater than $200,000. Another limitation of direct synthesis using a wideband eDAC is distortion from limited memory depth.

In yet other examples of existing RF generators, the optical beating of continuous wave (CW) sources is used to generate RF carriers. This approach eliminates the voltage-controlled oscillator (VCO) in the electronic transceiver but the eDAC and mixer requirements are not alleviated. Yet another approach eliminates the mixer but not the stringent eDAC or VCO requirements. In yet another example, photonic arbitrary waveform generators have also been proposed but these techniques do not efficiently redirect power to the required RF spectrum.

Embodiments of the disclosed technology photonically generate arbitrary passband signals in the RF and microwave frequency range while eliminating the need for a VCO, a mixer and a wideband eDAC. In an example, the generated passband signals may have instantaneous bandwidths of about 1 GHz and carrier frequencies ranging from 2 GHz to 50 GHz.

In example embodiments, the operation of the RF generator is based on photonically generating an RF pulse which is directly modulated using low bandwidth eDACs. Ultrashort, low jitter optical pulses from a mode-locked laser (MLL) sample the input voltages such that the clock jitter from eDACs is suppressed. High modulation bandwidths can be obtained through multiplexing multiple RF modulated pulse trains. Thermal noise performance can be improved through optical stacking of multiple eDACs for incoherent averaging boosts. Furthermore, since the signal generation is photonic, the RF signal can easily be transported over long distances and in bulk, through optical fiber, thus eliminating crosstalk and allowing for low power remote transmission units. Furthermore, the approaches described in this document, among other features and benefits, alleviate the jitter requirements on the eDAC, eliminate the VCO and the mixer, increase the tunable range of the wireless transceiver, increase the modulation bandwidth and efficiently redirect power to the required portion of the RF spectrum.

In some embodiments, the phase noise of the photonic arbitrary passband signal generator can be furthered improved by using an optical jitter correction feedforward subsystem to further lower the phase noise of optical pulse trains. An example approach to making a very low jitter RF signal generator from an optical pulse train includes (1) measuring the jitter of an optical pulse train as accurately as possible, (2) using that jitter information to correct its deleterious effects as precisely as possible, and (3) using that jitter corrected signal to make a very low jitter RF signal generator.

Several existing systems and implementation have been developed to measure optical pulse train jitter. These include:

(1) Electronic reference jitter measurement: Optical pulse timing can be measured by impinging the pulse train on a photodiode and measuring the timing fluctuation of the now-electrical pulses with electronic instruments. This signal can then be measured with analog-to-digital converters/ an oscilloscope, or with an RF spectrum analyzer. Alternatively, the optical pulse timing can also be measured by detecting the optical pulse train and comparing to a microwave reference oscillator.

(2) Optical pulse train reference jitter measurement: A different optical pulse timing technique measures the strength of a nonlinearly generated wave which is dependent on the relative timing of pulse pairs in two pulse trains each from a different source. This technique uses what is referred to as a balanced optical cross-correlator.

(3) Optical delay reference jitter measurement: The optical pulse timing can also be measured against an optical delay. One example of this measures the interference between an optical pulse train and a copy of it that has been delayed in an optical fiber. Since the linear interference pattern is sensitive to the optical phase and carrier envelope offset in addition to the pulse timing jitter, the optical interference pattern is filtered at two different colors and detected, and mixing these two photodetection signals cancels the common optical phase and carrier envelope offset, but leaves the pulse timing jitter information.

(4) Optical CW reference and f-2f stabilization jitter measurement: The optical pulse timing can also be measured by referencing against a stabilized continuous wave (CW) laser. This technique includes (1) stabilizing a CW laser against an ultra-high Q cavity, (2) generating a carrier-envelope offset frequency via octave-spanning spectral broadening and a f-2f interferometer, (3) beating the CW laser with the optical pulse train in a photodetector, and (4) mixing the former with the latter to eliminate the carrier envelope offset, resulting in a signal that depends only on the pulse train jitter and the CW laser frequency.

Several of these techniques can use the jitter error signal to stabilize the optical pulse train to generate a stable optical pulse train. This stable optical pulse train can then be detected to create a low jitter RF oscillator. This low jitter RF oscillator can become an RF signal generator by electronically mixing with a direct digital synthesizer.

However, some of these methods cannot measure the jitter precisely or are very complex. When measuring jitter, techniques that use an electronic reference are limited by the poor high frequency offset phase noise of electronic references. Multiple other techniques that use an optical reference are limited by the poor low frequency offset phase noise of optical references. Techniques that use a stabilized CW reference require ultrahigh Q cavities which are extremely fragile and temperature/vibration sensitive, require multi-staged phase-locked loops for both the repetition rate and the carrier-envelope offset, and further require complicated subsystems that perform spectral broadening and carrier-envelope offset control using the f-2f interference signal.

Furthermore, some existing systems and implementations have limitations in environmental sensitivity. In each of them, the optical pulse train is stabilized to a reference to varying degrees of precision. However, in all the existing approaches discussed here, the reference is sensitive to changes in the temperature or vibrations through various physical mechanisms. This necessitates temperature and vibration isolation, and increases size and weight of the device. And in rougher environments, the amount of requisite isolation and hence size and weight increases.

Furthermore, some existing systems and implementations have limitations in whether they can correct the jitter. When the jitter is measured with an averaging instrument (e.g. an RF spectrum analyzer), the temporal dependence of the jitter error information is lost, so this information cannot be used to correct the jitter. Other techniques that retain the temporal dependence can use this error signal to stabilize the repetition rate and can, upon photodetection, use it to create a low jitter RF oscillator or RF signal generator.

Furthermore, some existing systems and implementations have limitations in how well they can correct the jitter. Some systems cannot correct high frequency offset phase noise due to the feedback delay time and limited bandwidth of devices in the feedback loop.

Furthermore, some existing systems and implementations have limitations when creating a RF oscillator from such an optical pulse train. One issue is the limited SNR at high RF signals. The power of the RF signal, as well as the shot noise-limited SNR, is limited by the photodetector power handling, and the fact that much of the total RF power is needlessly spread in unused harmonics of the pulse train. After filtering unused harmonics, if one were to amplify such an RF signal, that would not only amplify the shot noise, but also add the RF amplifier's amplitude and phase noise. To get around the lower power at the higher RFs, some techniques make an RF signal generator by mixing a lower frequency RF signal out of the photodetector with a direct digital synthesizer. However, this adds the latter's phase noise, which pollutes the total phase noise of the RF signal generator.

Embodiments of the presently disclosed technology overcome the high phase noise limitations of an electronic reference or optical pulse train reference by using a digitally corrected optical delay reference. The examples provided herein, by the way of example and not by limitation, sometimes refer to jitter measurements. It should be understood, however, that the disclosed embodiments are applicable to measuring all types of timing errors, and can be specially beneficial in applications where real-time timing error measurements on a pulse-by-pulse basis is needed for in-situ correction or optimization of signal generation or processing systems. The concept of the digitally corrected delay reference is illustrated using jitter measurements as an example. In particular, various embodiments described herein exhibit, among other features and benefits, some or all of the following advantageous characteristics with respect to existing systems and implementations.

(1) Absence of ultrahigh Q cavities multi-staged phase-locked loops and complicated subsystems that perform spectral broadening and carrier-envelope offset control using the f-2f interference signal by using a digitally corrected optical delay reference.

(2) No requirement for isolation material/devices that increase with temperature and vibration perturbations by using a digitally corrected optical delay reference.

(3) Measuring the jitter in real time by measuring the jitter information digitally, which can be used to correct for the jitter.

(4) Using feedforward jitter correction, which can correct the high frequency offset phase noise of the output RF signal.

(5) Spectrally redirecting the generated RF power in the single frequency of interest, thereby concentrating power in the RF harmonic of interest and not wasting photodetector optical power handling.

(6) Tuning the frequency in the optical domain, which suppresses the transfer of phase noise from the direct digital synthesizer to the output RF signal and results in a low phase noise RF oscillator or RF generator.

Some embodiments of the presently disclosed technology generate an arbitrary passband signal, which may be viewed as a sinusoid whose phase and amplitude are changing with time. Thus, the described embodiments are configured to dynamically control the phase and amplitude of an input sinusoidal signal.

Temporal optical modulation (as described, for example, in U.S. Pat. No. 8,934,058, which is incorporated by reference in its entirety for all purposes in this document) creates optical pulses with interference fringes which move laterally according to a phase of an input analog voltage. For arbitrary passband signal generation, not only do the interference fringes need to move laterally, but their extinction must also be controllable to create amplitude modulation. Thus, when these interference fringes are mapped from the spectrum to time, the interference fringes form an RF pulse with the lateral movement translating to phase modulation and the extinction translating to amplitude modulation. With both amplitude and phase modulation, the entire basis space can be accessed to enable the generation of arbitrary passband signals as disclosed herein.

In some embodiments, the methods and devices described herein generate an RF pulse train and dynamically control each pulse's phase and amplitude, which is subsequently interpolated in the analog domain to create an arbitrary passband signal. As illustrated in FIG. 1, the operations than can be carried out in accordance with some embodiments of the disclosed technology can include the following:

(1) Generating interference fringes in the spectrum of an optical pulse;

(2) Shifting the interference fringe laterally in the spectrum of the optical pulse using an input analog voltage;

(3) Setting the extinction of the interference fringes in the spectrum of the optical pulse according to an input analog voltage;

(4) Mapping the spectrum to time and optical to electrical conversion to create a modulated RF pulse train; and (5) Interpolating the RF pulse train in the analog domain.

For example, and as shown in FIG. 1, a periodic train of optical pulses is passed through the voltage tunable optical filter (VTOF), which creates an interference pattern in spectrum (or the frequency- or wavelength-domain) whose period can be coarsely set. In the illustration of FIG. 1, the time-domain pulse train is depicted as being two pulses (Pulse A and Pulse B) that are separated by Ts; the equivalent spectral representations of the two pulses are shown on the bottom section of FIG. 1 that are input to the voltage tunable optical filter. In the depicted example of FIG. 1, the evolution of each pulse (both in time and spectral domains) are illustrated for each of the two pulses. For example, while the input pulses to the voltage tunable optical filter are illustrated as having identical temporal and spectral characteristics, Pulse A and Pulse B at the output of the voltage tunable optical filter have differing spectral modulation characteristics due to a change in the R, C and φ voltage levels when Pulse B is input to the voltage tunable optical filter. As will be described in further detail, using up to three input voltages (e.g., R, C and φ), the fringe offset, fringe period and the extinction of the spectral interference pattern can be controlled. The electronic voltage level generators are used to output a train of voltage levels that correspond to the required fringe shift and extinction for each pulse. The optical pulse train out of the voltage tunable filter is then passed through a dispersive element (e.g., an optical fiber having an index of refraction that is a function of wavelength) to convert the spectral interference pattern to time. This time-domain optical signal is transformed into a modulated RF pulse train upon opto-electric conversion using a photodetector (more generally, an optical-to-electrical converter).

The period of the spectral interference pattern along with the dispersive element set the carrier RF on the pulse train. The fringe offset and the extinction set the phase and the amplitude of the carrier RF for that pulse, respectively. Thus, for a given dispersive element, the period, fringe offset and extinction of the interference pattern directly correspond to the frequency, phase and amplitude of a carrier RF on a pulse. Interpolating this modulated RF pulse train, using a bandpass filter, creates an arbitrary waveform around the set carrier RF.

In some embodiments, the dispersive element may include dispersion compensation fibers that account for chromatic dispersion when performing the wavelength-to-time mapping.

In some embodiments, the photodetector may be a balanced photodetector that receives two optical input signals to facilitate suppression of common fluctuations of the inputs.

Figure 2:
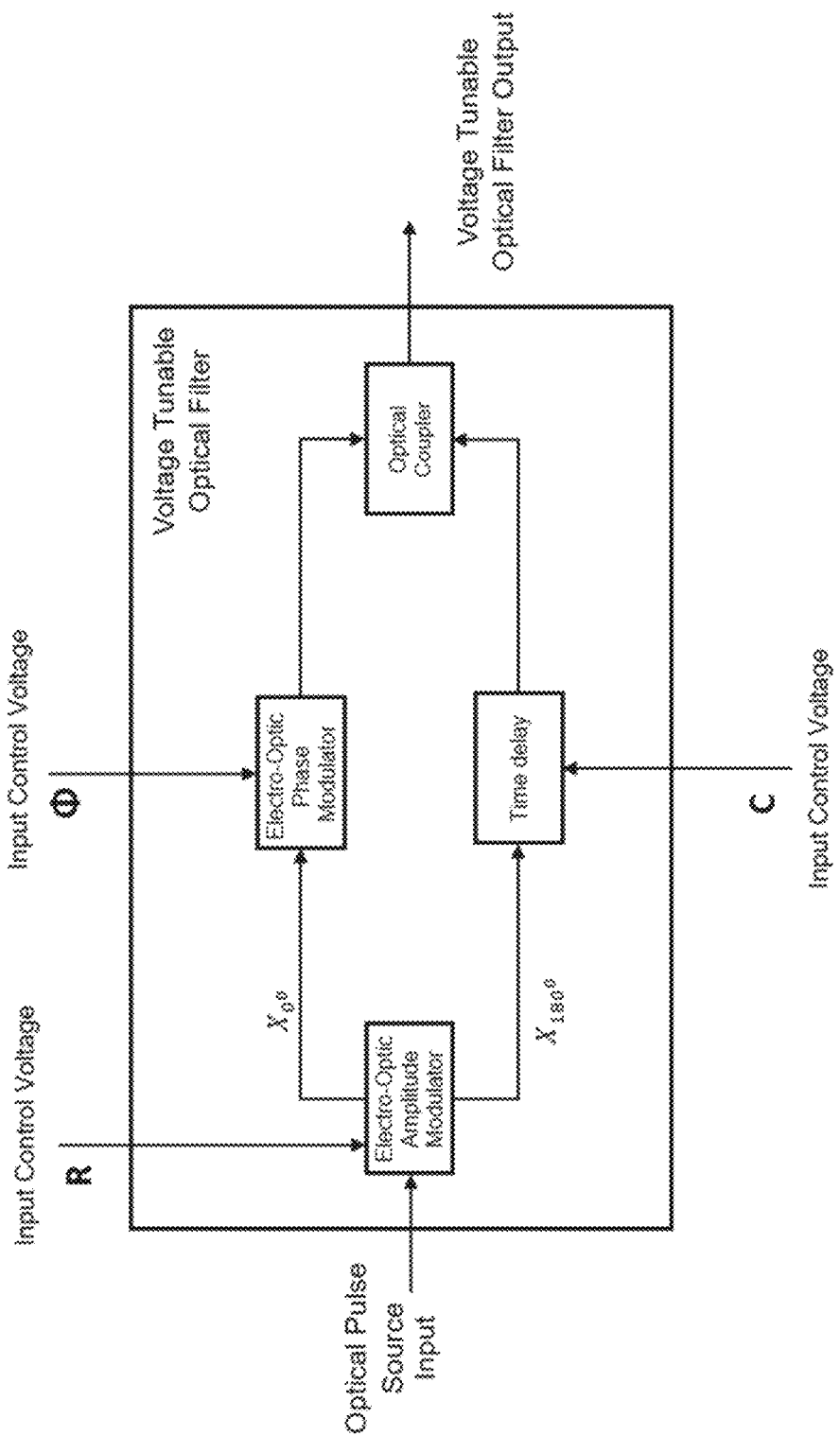
FIG. 2 is a block diagram representation of an example of a voltage tunable optical filter (VTOF), in accordance with some embodiments of the disclosed technology.

FIG. 2 is a block diagram representation of an example VTOF, which includes (a) an electro-optic modulator to control the amplitude of the optical pulse, (b) an electrooptic modulator to control the spectral phase of the optical pulse, and (c) an unbalanced interferometer to create an interference pattern in the spectrum of the optical pulse. The operation of a VTOF can include the input optical pulse being amplitude modulated using an electro-optic amplitude modulator such as a Mach-Zehnder Modulator (MZM). In an example, the two complementary output arms of the electro-optic amplitude modulator are unbalanced using a time delay. One of the arms undergoes an additional phase modulation using an electro-optic Phase Modulator (PM). The two arms are then coupled back together to produce an optical spectral interference pattern with a controlled fringe shift and extinction. In some examples, the optical coupler illustrated in FIG. 2 is an optical combiner. The extinction of the optical spectral interference pattern is controlled using the electro-optic amplitude modulator and its fringe shift is controlled using the electro-optic phase modulator according to the input voltage levels. The period of the interference pattern can be controlled by changing the timing imbalance between the MZM arms. Thus, the output optical pulse has a controllable spectral interference pattern.

The VTOF illustrated in FIG. 2 may be implemented using fiber optic commercial-off-the-shelf components. For example, fiber optic MZMs and PMs are available from vendors (e.g., EOSpace, Versawave), and a fixed timing imbalance between the complementary arms of the MZM can be achieved using a length of single mode fiber as the time delay block in FIG. 2. For another example, a variable timing imbalance can be obtained by using an analog or electronically controllable optical delay line as the time delay block in FIG. 2. Fiber-optic 3 dB couplers and variable optical delay lines are available from vendors (e.g., Thorlabs, OzOptics).

Figure 3:
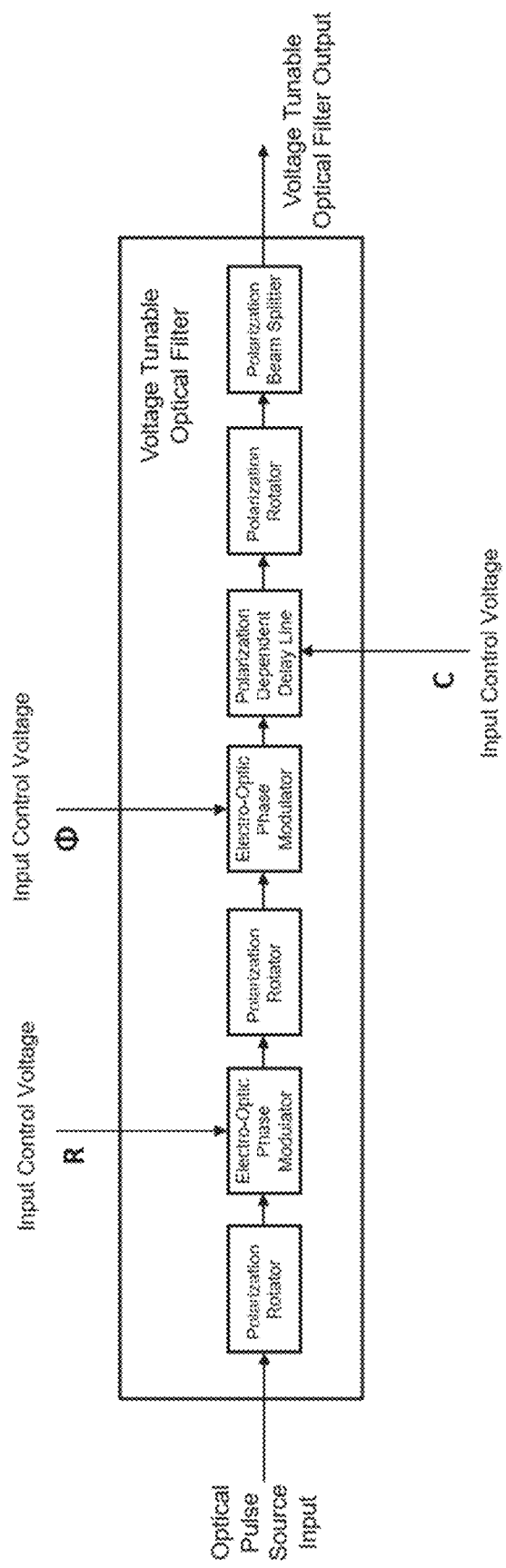
FIG. 3 is a block diagram representation of another example of a VTOF, in accordance with some embodiments of the disclosed technology.

FIG. 3 is a block diagram representation of another example VTOF, which includes (a) three 45-degree polarization rotators, (b) two electro-optic modulators to control the phase of the optical pulse, (c) polarization dependent delay line and (d) polarization beam splitter. In this example, the combination of a polarization rotator, electro-optic phase modulator followed by another polarization rotator, modulates the amplitude of the optical pulse to control the extinction of the spectral interference pattern. In an example, the optical input to the VTOF needs to be linearly polarized. The first 45-degree polarization rotator splits the power equally among the orthogonal polarizations (e.g., slow and fast axis). The phase modulator modulates the first phase of the polarizations according to an input voltage. The 45-degree rotation from the second polarization rotator cause the two arms to interfere with each other in the slow and fast axis such that they present the complementary arms of an amplitude modulator. The second electro-optic phase modulator applies an additional phase modulation on one of the polarizations to control the fringe offset of the spectral interference pattern. The polarization dependent delay line, such as polarization maintaining, highly birefringent fiber, creates a time delay between the orthogonal polarizations, thus unbalancing the two arms creating a controlled, dynamic interference pattern in the spectrum of the optical pulse on coupling. The combination of a polarization rotator and a polarization beam splitter couples the two arms of the interferometer back together. The period of the fringes of the interference pattern can be coarsely set by appropriately selecting the polarization dependent delay. This example uses a common path for both the arms of the interferometer, thus leading to lower instability due to environmental effects.

In an example, the common path embodiment of the VTOF can also be built using fiber optic commercial-off-the-shelf components. For example, fiber optic low native birefringence phase modulators are available from vendors (e.g., Versawave). For this type of VTOF, low native birefringence electro-optic modulators are well-suited, since the pulses in orthogonal polarizations will travel through the modulator with close to the same velocity. In an example, the polarization dependent delay between the complementary arms of the interferometer can be achieved using a length of polarization maintaining, highly birefringent fiber. In another example, the polarization rotation can be achieved using a fiber optic Faraday rotator. In yet another example, a "style 2" polarization beam splitter can function as a polarization rotator in conjunction with a polarization beam splitter.

Figure 4A:
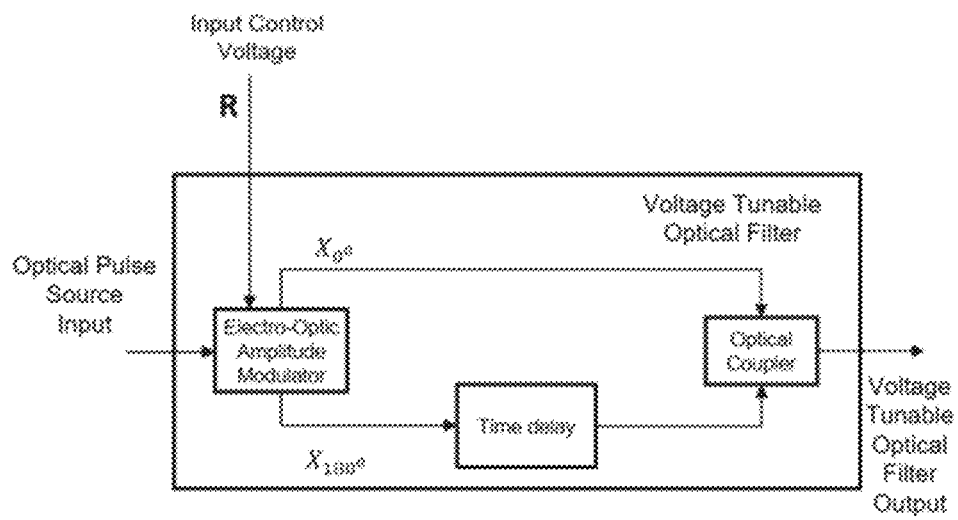
FIG. 4A is a block diagram representation of yet another example of a VTOF.
Figure 4B:
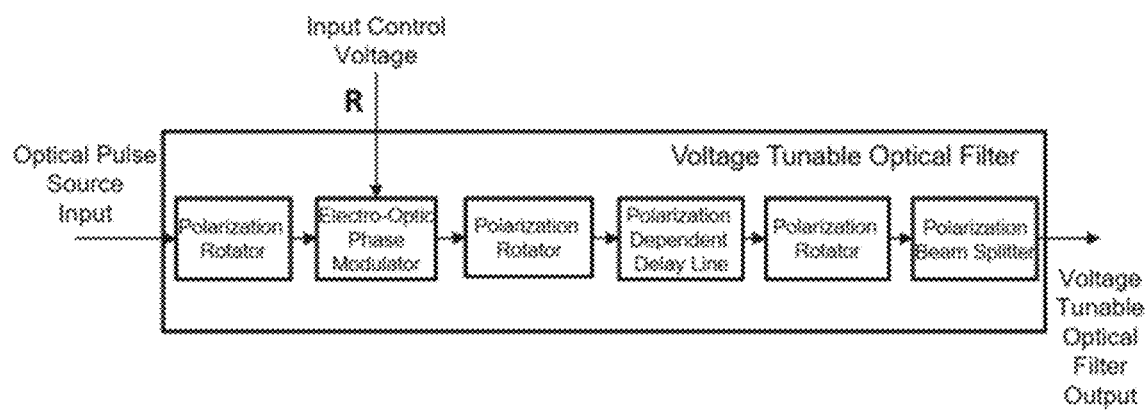
FIG. 4B is a block diagram representation of yet another example of a VTOF.

FIGS. 4A and 4B illustrate embodiments of the presently disclosed technology that use only the electro-optic amplitude modulator portion, thereby only changing the extinction of the spectral interference fringes. When used in the photonic arbitrary passband signal generator, the generated RF waveform has information in only one axis of the orthogonal basis space, e.g., amplitude modulated RF signals. This is analogous to heterodyne RF signal generation or bandpass digital to analog conversion.

Figure 5:
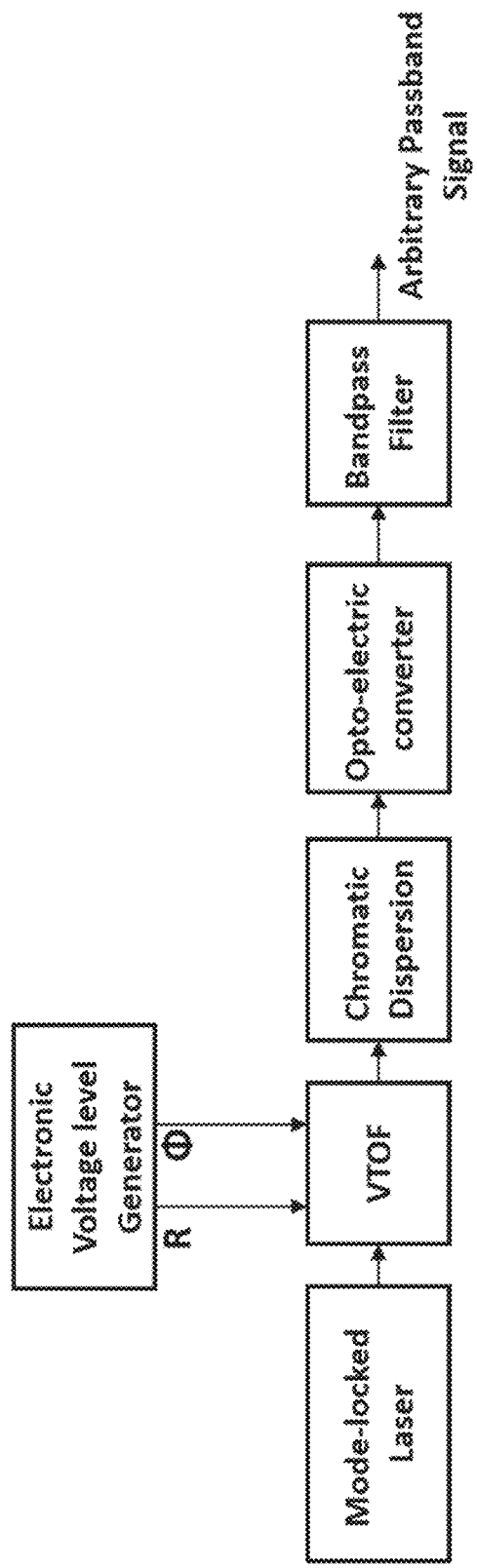
FIG. 5 is a block diagram representation of an example photonic arbitrary passband signal generator, in accordance with some embodiments of the disclosed technology.

FIG. 5 is an illustration of a system using the VTOF in a photonic arbitrary RF passband signal generator, in accordance with some embodiments of the disclosed technology. As illustrated therein, the embodiment includes (a) an optical pulse source, (b) a VTOF (sometimes referred to as a voltage tunable filter) to create a controllable interference pattern in the spectrum of an optical pulse, (c) three electronic voltage level generators (denoted R, C and Φ) to drive the VTOF, (d) a dispersive element to map the spectrum into time, (e) a photodetector to convert optical waveforms to electrical waveforms, and (f) a bandpass filter to interpolate the signal in the analog domain. In the embodiment of FIG. 5, the voltage level generators operate as three control inputs to control different characteristics of the generated output RF passband signal; these are depicted as the amplitude and phase, R and Φ, signals, and a control signal, C, such as a voltage value. In some embodiments, only one of the three electronic voltage level generators (e.g., R) may be included, whereas in other embodiments, two of the three electronic voltage level generators (e.g., R and Φ) may be included.

An example method of operation for the system illustrated in FIG. 5 includes the following steps—a periodic train of optical pulses is passed through a VTOF that creates an interference pattern in spectrum whose fringe spacing can be coarsely set as described above. Using two input voltages, the fringe offset, and the extinction of the spectral interference pattern can be controlled. The electronic voltage level generators are used to output a train of voltage levels that correspond to the required fringe shift and extinction for each pulse in the optical pulse train. The optical pulse train out of the voltage tunable filter is then passed through a dispersive element to map the spectral interference pattern to time, thus creating a modulated RF pulse train upon opto-electric conversion using a photodetector. The period of the spectral interference pattern along with the dispersive element sets the carrier RF on the pulse train. The fringe offset and the extinction sets the amplitude and phase of the carrier RF for that pulse. Interpolating this modulated RF pulse train, using an appropriate bandpass filter, creates an arbitrary passband signal around the set carrier RF. The repetition rate of the optical pulses sets the maximum modulation bandwidth of the system.

In some embodiments, the embodiments described in US 8,934,058 can also be used as the VTOF in the photonic arbitrary passband signal generator. These embodiments of the VTOF can be realized using only the phase modulation portion of the embodiments described in FIGS. 2 and 3. In case of the embodiment illustrated in FIG. 2, a 50/50 power splitter would be used in place of the electro-optic amplitude modulator. In case of the embodiment illustrated in FIG. 3, the first polarization rotator and electro-optic modulator are not needed. The use of this voltage tunable filter in these embodiments results in a phase modulated RF signal (no amplitude modulation), which can be used to generate arbitrary RF tones and/or phase shift keyed signals used in wireless communications etc.

In some embodiments, a simple fiber optic-based laboratory prototype can be built using commercial-off-the-shelf components. For example, to build a system with a 1 GSps maximum modulation bandwidth, a 1 GSps mode locked laser can be used as the optical pulse source. Any of the embodiments of the VTOF described above can be used depending on the type of signals that need to be generated and the stability requirements. Electronic digital-to-analog converters (eDACs) that can run at sample rates of 1 GSps can be used as the electronic voltage level generators to dynamically control the amplitude and phase of each optical pulse through the VTOF. A dispersion compensating fiber can be used as the dispersive element followed by a photodetector that can go out to the required carrier frequency. Analog band pass filters are available from a variety of analog component vendors.

In some embodiments, the complementary outputs of the VTOF may be used and the outputs summed post opto-electric conversion. In an example, this can be achieved using a balanced photodetector or RF coupler post opto-electric conversion. The added benefit of this realization is to reduce the distortion from the DC component of the all positive RF pulse train from opto-electric conversion. While the bandpass filter removes the DC component to a certain extent, subtraction of the complementary outputs is a more effective method. Also, the signal-to-noise ratio of the passband signal is boosted through incoherent averaging of the thermal noise of the photodetector.

Figure 6:
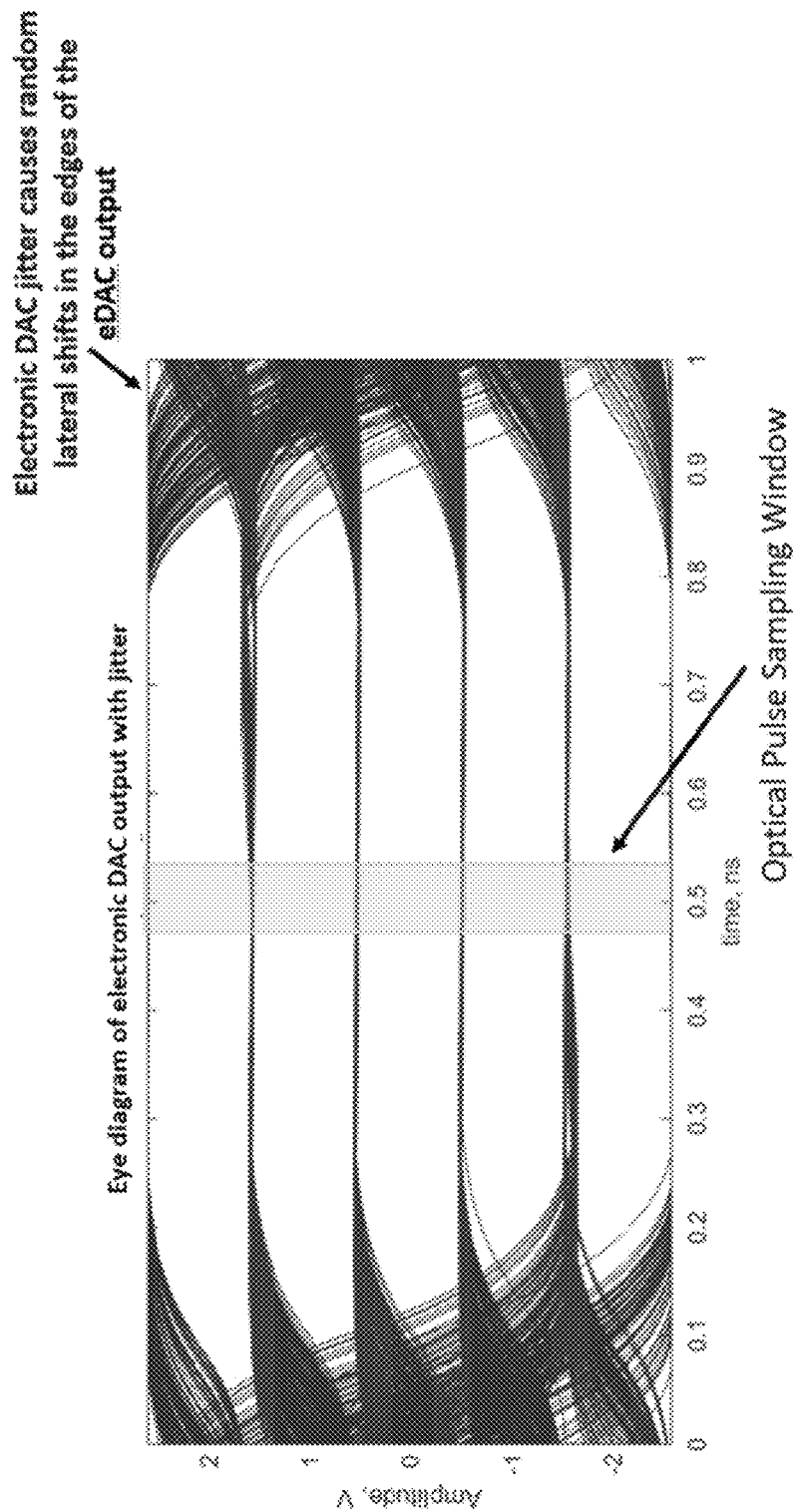
FIG. 6 is an eye diagram plot that illustrates reduction of electronic phase noise through optical pulsed source sampling, in accordance with some embodiments of the disclosed technology.

In some embodiments, electronic phase noise suppression may be achieved through pulsed optical sampling. The electro-optic modulators in the voltage tunable filters use a short optical pulse to sample a relatively wide voltage pulse from the electronic voltage level generator, such as an eDAC. FIG. 6 is an eye diagram plot (of a train of five voltage levels from an eDAC) that illustrates reduction of electronic phase noise through optical pulsed source sampling. As illustrated in FIG. 6, the effect of the phase noise from the clocks of the eDAC are limited to the edges of the voltage pulse. Thus, sampling the wide voltage pulse at the center using a short optical pulse limits the transfer of the phase noise into the final signal generated by the system.

FIGS. 7A and 7B are block diagram representations of example spectral pulse shaping subsystems, which are configured to perform optimal pulse sampling. As illustrated in FIGS. 7A and 7B, the example spectral pulse shaping subsystems can include:

(1) An optical frontend configured to impart the analog RF input onto an optical pulse train generated by the optical pulse source. In some embodiments, the optical frontend may optionally include an optical filter;

(2) An RF backend that performs filtering, mixing and downconversion operations, and specifically, using the output from an optical LO generator (not shown in FIGS. 7A and 7B) to mix and downconvert the output from the optical frontend; and (3) An analog-to-digital converter (ADC) to convert the output of the RF backend from an RF analog signal to a digital signal. In some examples, a high-sensitivity ADC is used.

While it is desirable to have high repetition rate optical pulses for larger Nyquist bandwidths, the finite bandwidth of the RF backend can potentially cause closely spaced pulses to spread into each other, causing inaccurate sampling (as illustrated in FIG. 7A). It is well known that this problem, known as inter-symbol-interference (ISI), can be alleviated if, at the precise sampling instant of a pulse, neighboring pulses are shaped to have nearly zero energy.

One embodiment of such a pulse shaping system is to shape the spectrum of the optical pulse train before passing through the VTOF (as illustrated in FIG. 7B). In an example, the VTOF may be as described in FIGS. 2, 3, 4A and 4B. After dispersion, the spectral shape of the filter will be converted into the time domain envelope of the pulse, which will eventually be converted to an RF pulse through the photodetector. In this way, the optical filter can be used to fine tune the RF pulse shape in such a way that, after passing through the RF backend, the pulse will have negligible energy at the next sample (e.g., its energy will vanish T seconds after its peak, where T is pulse period).

In some embodiments, the spectral pulse shaping subsystem could use a standard photodetector. In other embodiments, a balanced photodetector is used if both complimentary outputs of the VTOF are available. A balanced photodetector has the benefit of providing more control over the RF pulse shape, at the cost of greater timing sensitivity.

In some embodiments, the optical filter (also referred to as a wave shaper) illustrated in FIG. 7B may include an optical modulator (for wavelength-time mapping) and a static optical spectral shaping filter to advantageously compensate for the ISI effects due to the ADC. In an example, wavelength-time mapping (WTM) converts the spectral components of an ultrafast optical signal into a temporal sequence via linear dispersion. For example, a fast photodetector is used to probe the dispersively stretched pulse and convert it into a sequence of power readings that represent the spectral profile of the original pulse.

In the example illustrated in FIG. 7B, the optical filter is located before the optical frontend. In other examples, the optical filter may be located before or after the VTOF, or before or after the dispersive element. In effect, the optical filter must be placed prior to the photodetector to ensure that the pulse shaping due to the optical filter can compensate for the ISI.

In an example, the optical filter may be configured to match the transfer functions of the RF backend and/or ADC. For instance, the transfer functions of the RF backend and ADC may be first computed and combined. Then, a pre-compensation transfer function of the combined RF transfer function is computed and used to configure the optical filter. Applying the pre-compensation transfer function in the optical filter to the input signal pre-compensates for the effects of the RF backend and ADC (and more generally, the electronic components), thereby reducing or eliminating ISI.

Figure 7C:
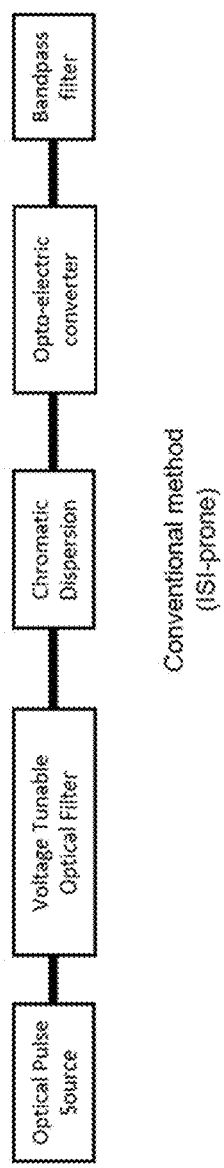
FIG. 7C is a block diagram representation of yet another example of a spectral pulse shaping subsystem.
Figure 7D:
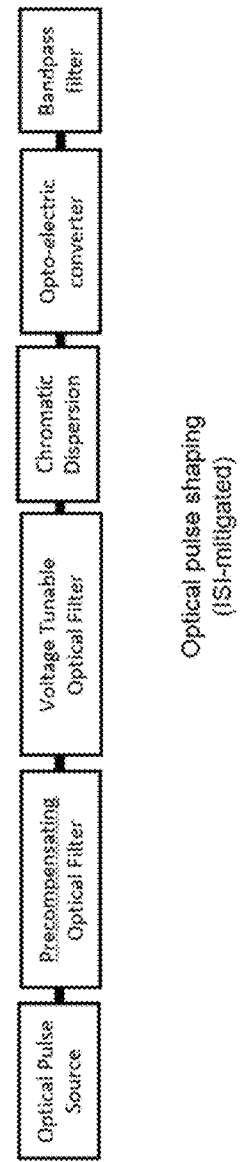
FIG. 7D is a block diagram representation of yet another example of a spectral pulse shaping subsystem.

In some embodiments, and as illustrated in FIGS. 7C and 7D, the spectral pulse shaping subsystem can be applied to the system illustrated in FIG. 1. In this example that applies precompensation to the system in FIG. 1, the optical filter may be configured to match the transfer functions of the optical-to-electrical converter and/or the bandpass filter. For instance, the transfer functions of the optical-to-electrical converter and bandpass filter may be first computed and combined. Then, a pre-compensation transfer function of the combined transfer function is computed and used to configure the optical filter. Applying the pre-compensation transfer function in the optical filter to the input signal pre-compensates for the effects of the optical-to-electrical converter and the bandpass filter, thereby reducing or eliminating ISI. The embodiments illustrated in FIGS. 7C and 7D can be configured such that the optical filter is at the output of the VTOF or the output of the dispersive element.

Ideally, the pre-compensation transfer function would be simply be the inverse of the RF transfer function. However, since the optical pulse energy must always be non-negative, arbitrary transfer functions are not possible. In an example, a method to calculate the optical pre-compensation transfer function includes reducing the repetition rate of the laser by a factor greater than 2, then manually tuning the optical filter shape and examining the first zero crossing point of the RF pulse. The filter can then be set to the point at which the first zero crossing occurs T seconds after its peak aligns. For simplicity, the optical filter shape can be set to produce a parameterized shape (e.g., a Tukey window).

Figure 8A:
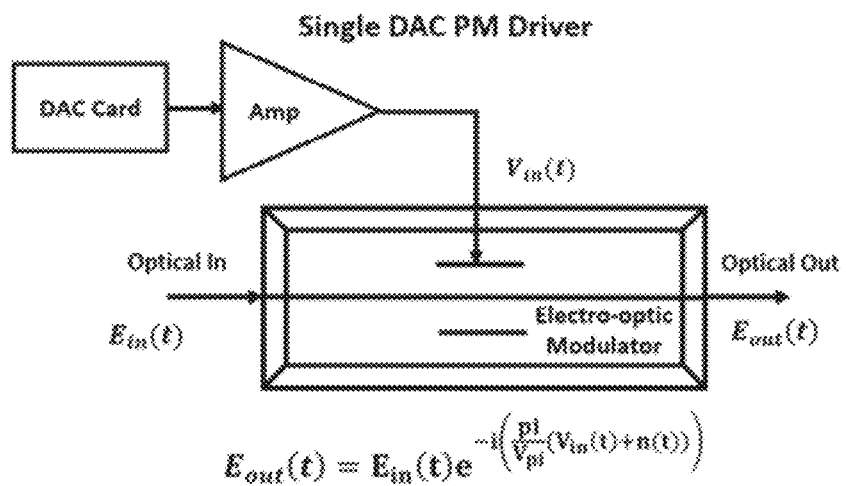
FIG. 8A illustrates an example of a single digital-to-analog converter (DAC) phase-modulated (PM) driver, in accordance with some embodiments of the disclosed technology.
Figure 8B:
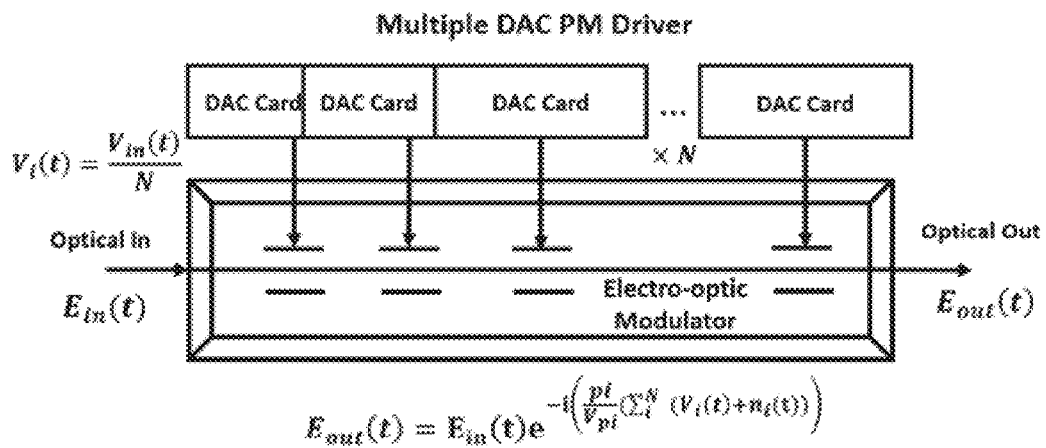
FIG. 8B illustrates an example of multiple DAC PM drivers that can replace the DAC of FIG. 8A in accordance an example embodiment.

FIG. 8A illustrates an example of a single digital-to-analog (DAC) phase-modulated (PM) driver, in accordance with some embodiments of the disclosed technology. As illustrated therein, a single eDAC (or DAC) card is used to drive the electro-optic modulator. Another advantageous feature of the described embodiments is the suppression of electronic voltage level generator's thermal noise that can be achieved through optical coupling of multiple eDACs as illustrated in FIG. 8B. As illustrated therein, multiple electro-optic phase modulators are cascaded, each driven using an independent eDAC, but with all the eDACs synchronized and outputting the same voltage level. In this way, the voltage levels will coherently add while the noise, being uncorrelated, will incoherently add. For a cascade of N electro-optic phase modulators, this results in the voltage level being boosted N times and the noise being boosted only $\sqrt{N}$ times, which results in a signal-to-noise ratio (SNR) boost of N (in power).

Another embodiment for suppressing the electronic voltage level generator's thermal noise may include using electro-optic phase or amplitude modulators with cascaded electrodes, each electrode driven by an independent eDAC but all eDACs synchronized and outputting the same voltage level. These configurations also alleviate the slew rate requirement of the drive signal, thus improving distortion performance.

Figure 9:
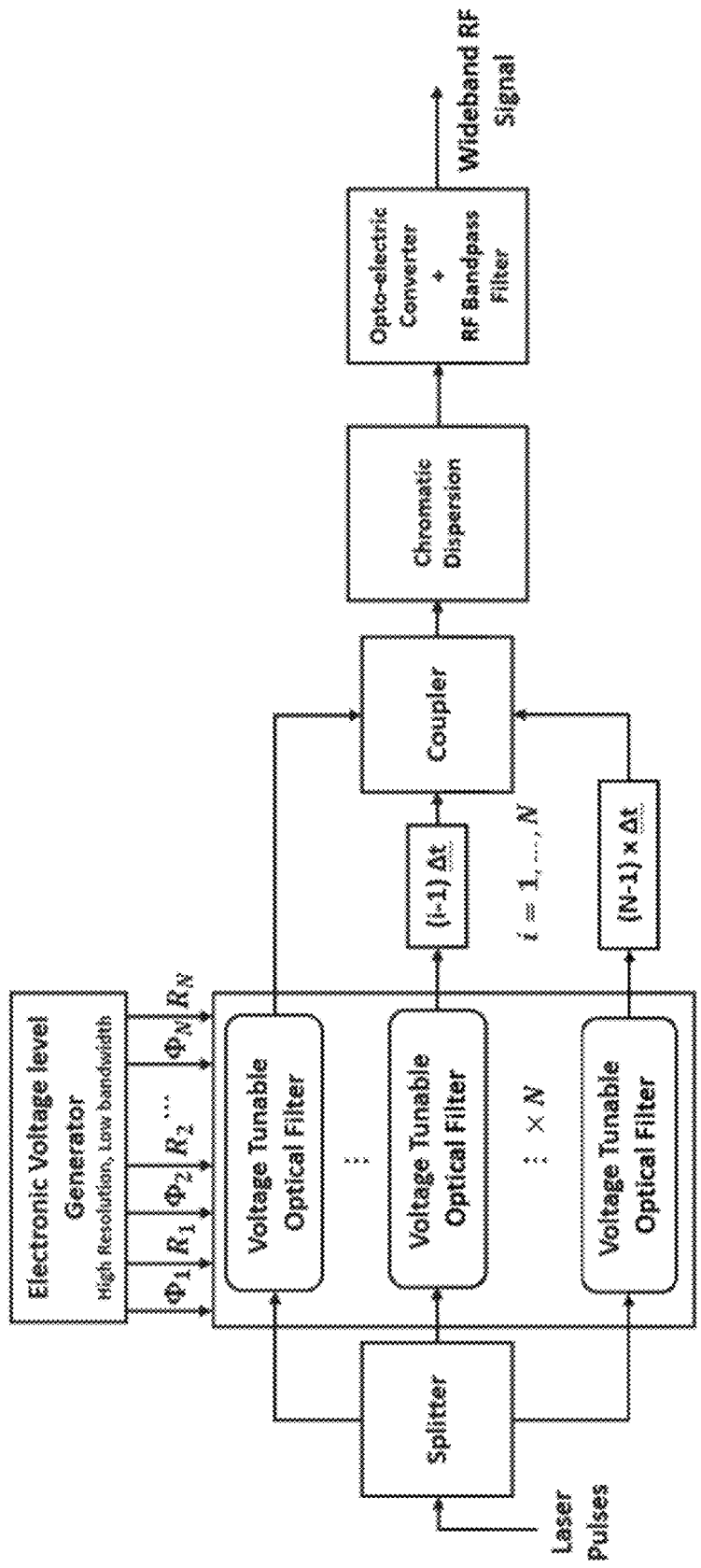
FIG. 9 is a block diagram representation of an embodiment of the disclosed technology to increase bandwidth through channelization of the VTOF.

Yet another advantageous feature of the described embodiments includes the ability to time-division multiplex multiple voltage tunable filters to increase the modulation bandwidth. One example embodiment is illustrated in FIG. 9. One goal of time-division multiplexing is to increase the number of pulses per unit time, thus effectively increasing the symbol rate or modulation bandwidth. The multiplexing can be done by splitting the optical pulse train into M channels, passing the pulse train from each channel through an associated voltage tunable filter with independent amplitude and phase modulation information set by time synchronized eDACs, time delaying each channel by $(i-1)\Delta t$ (where $i=1, \ldots, N$ is the channel number and $\Delta t$ is the desired time separation between each channel), coupling the channel back together, dispersing the combined optical pulse train, performing opto-electric conversion of the optical pulse train and interpolating in the RF domain. In this configuration, each channel can be processed at a slower rate, thus enabling implementation of lower cost components and/or enabling higher data rates which may not be feasibly implementable in a channel. In some embodiments, the time delay and the voltage tunable filter steps are interchangeable, as are the coupling and dispersion steps. In some embodiments, each of the voltage tunable optical filters can include a control voltage, C, input as discussed in connection with FIG. 2.

Figure 10A:
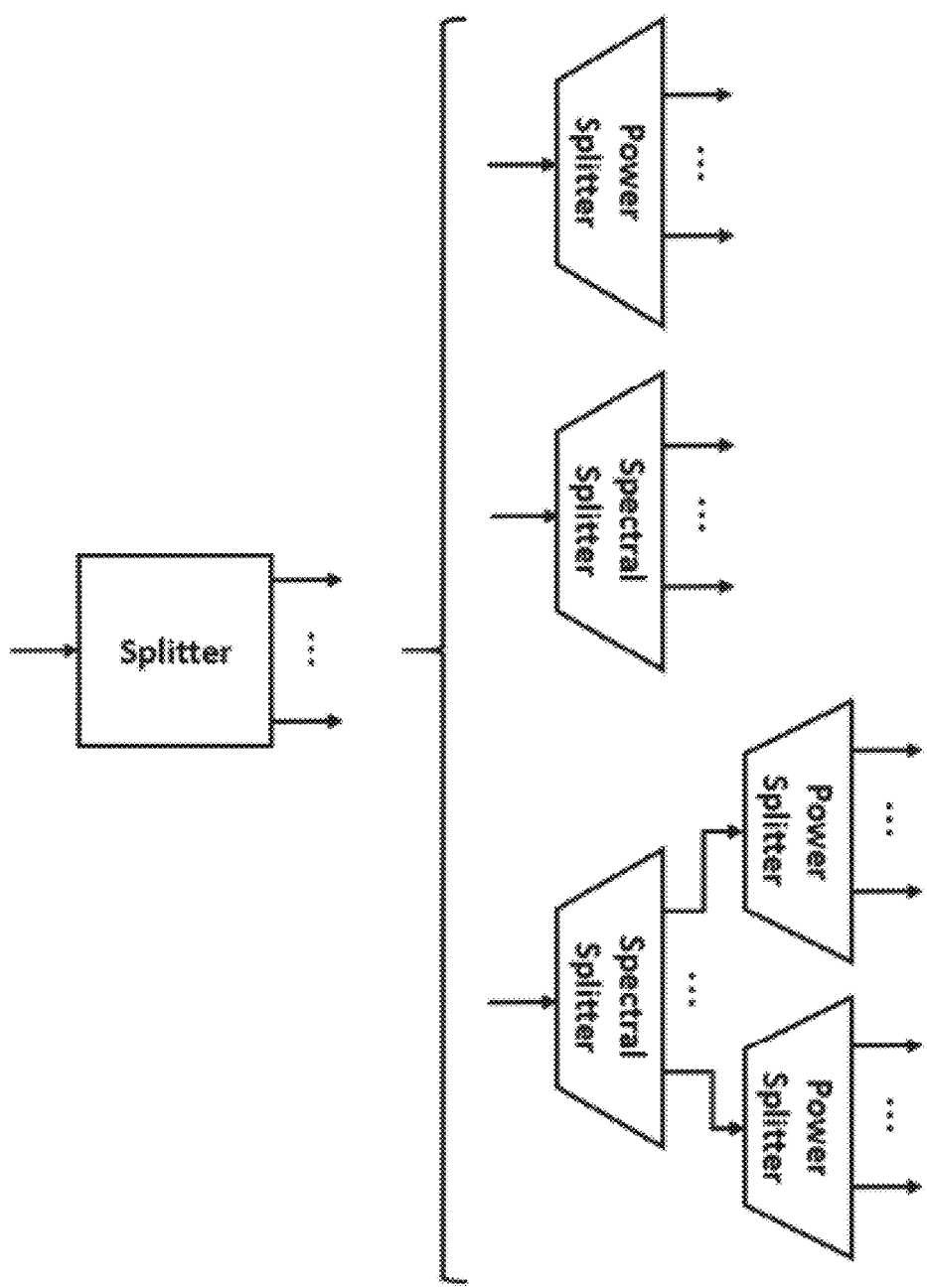
FIG. 10A illustrates an example of a splitting architecture that can be used, for example, in the embodiment illustrated in FIG. 9.
Figure 10B:
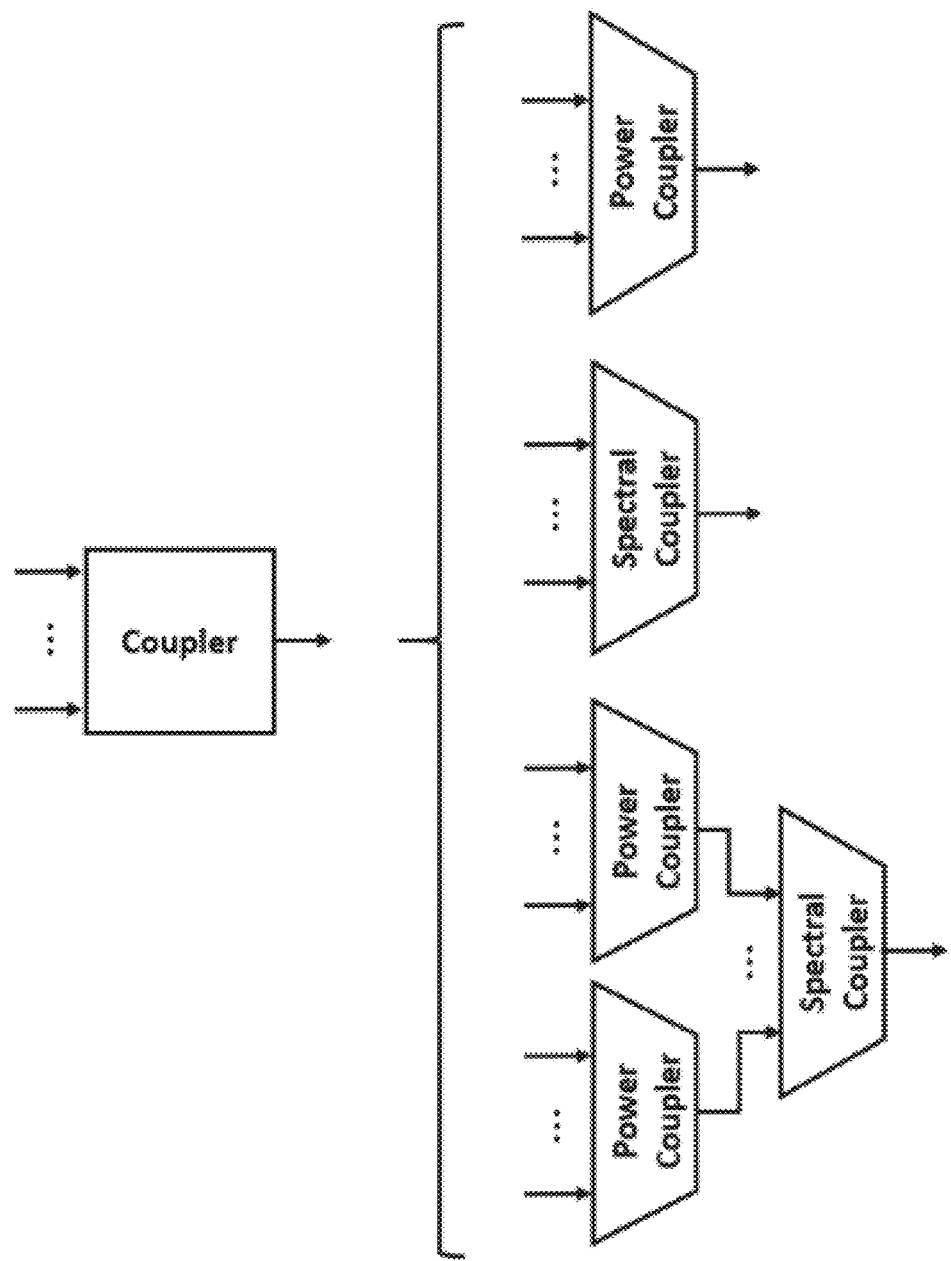
FIG. 10B illustrates an example of a coupling architectures that can be used, for example, in the embodiment illustrated in FIG. 9.

In some embodiments, the splitting/coupling of the optical pulse train can be done in power, using a passive splitter/coupler, in spectrum, using a wavelength division multiplexer (WDM) or a combination thereof. For example, FIG. 10A illustrates a spectral splitter configuration that uses a tree architecture; FIG. 10B a spectral coupling architecture based on a tree architecture.

Figure 11:
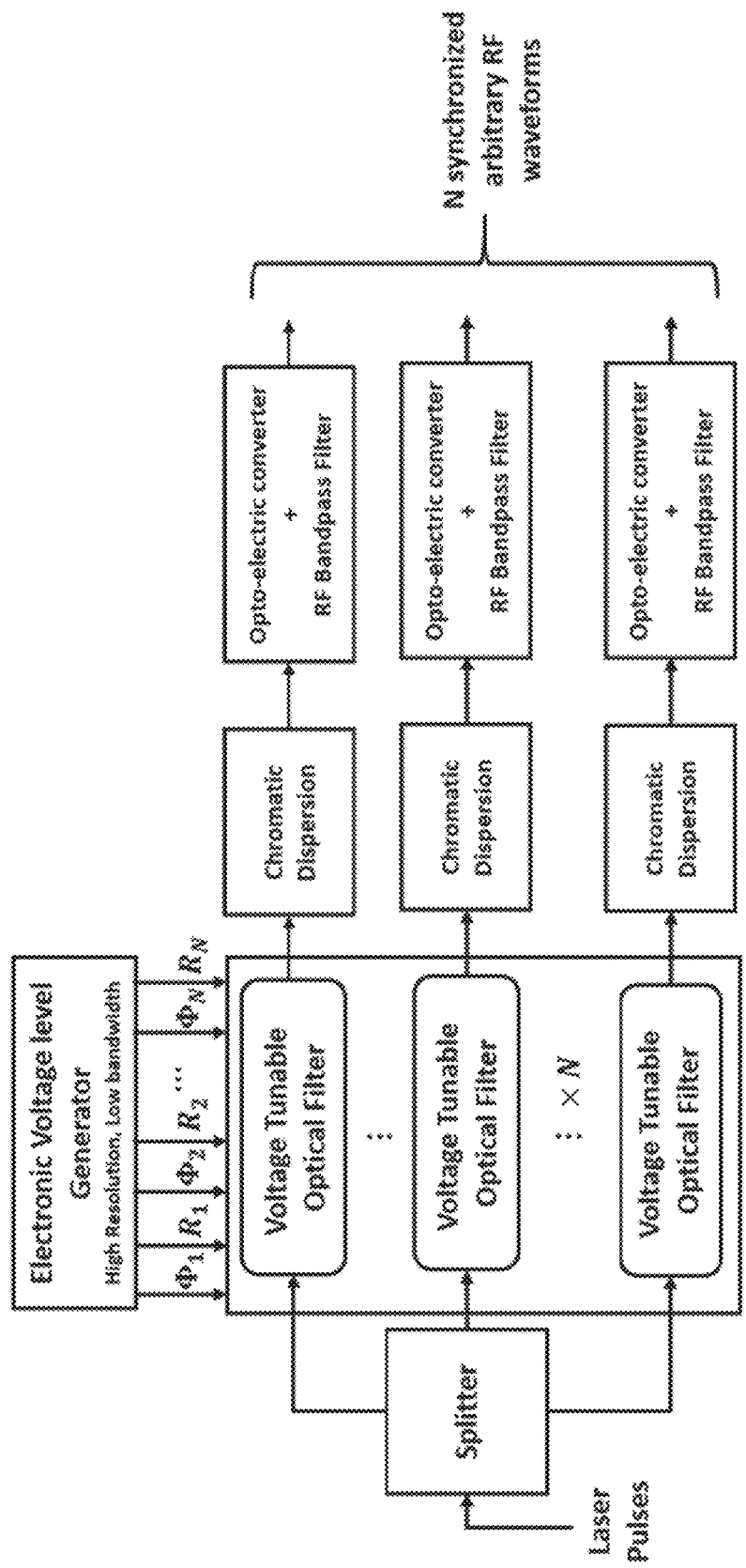
FIG. 11 is a block diagram representation of an embodiment of the disclosed technology to generate N synchronized arbitrary RF waveform channels.

FIG. 11 is a block diagram representation of an embodiment of the disclosed technology to generate N synchronized arbitrary RF waveform channels. Such waveforms (or passband signals) are used frequently in phased array RF systems, quantum computing, and the like. As illustrated in FIG. 11, the optical pulse train is split into N channels, with each pulse train being passed through a voltage tunable filter with independent amplitude and phase modulation information set by time synchronized eDACs, dispersing each optical pulse train, opto-electric conversion of each optical pulse train and interpolating each RF pulse train. The voltage tunable optical filters can each receive a control input, C, as discussed in connection with FIG. 2. The splitting of the optical pulse train can be done in power, using a passive splitter, in spectrum, using a WDM or a combination of the two, as illustrated in the examples in FIG. 10A.

As previously discussed, an optical jitter correction subsystem can be integrated with the photonic arbitrary passband signal generator described above to further lower the phase noise of the passband signals generated. The optical jitter corrections system works as a feedforward system. In some embodiments, the optical pulse train out of the optical pulse source in FIG. 1 is split into two paths (not illustrated in FIG. 1). One path goes to the VTOF and continues through the rest of the system illustrated in FIG. 1. The second path is sent into the optical jitter measurement and error signal generator subsystem. The subsystem measures the jitter on the pulse train and feeds the error signal to the electronic voltage level generator which incorporates the error correction value to the phase control signal. Since the phase control signal finely tunes the delay of the pulses inside the VTOF, the jitter can be corrected by adding the appropriate amount of phase and amplitude voltages according to the error signal.

In some embodiments, the jitter measurement and error signal generator system, henceforth referred to as the "jitter meter subsystem", includes a one or more optical pulse train sources, an optical hybrid, optical filters, photodetectors, analog-to-digital converters, and a digital processor. The optical pulse train source will usually originate from a pulsed laser, which is usually a mode-locked laser or cavityless pulsed source or Kerr comb. The optical pulse train source in some embodiments is the device being measured, and hence is not part of a specific embodiment, but in others it is part of the specific embodiment. The coupler is a device that splits the input optical wave (or combines two input optical waves from ports In1 and In2 into two output optical waves at ports Out1 and Out2, each with a fraction of the power of the input(s). For optimal operation the coupler should maintain the polarization state of the input.

In some aspects, embodiments of the disclosed technology described herein can be used to obtain an accurate measurement of timing errors to generate a frequency agile radio-frequency (RF) signal. The disclosed embodiments also allow the timing information to be recorded in digital form for subsequent compensation or processing and allow timing error information to be obtained and utilized in real time.

Optical frequency combs can achieve a phase noise that is orders of magnitude lower than what is available from commercial microwave references. Thus, they have become revolutionary tools in high-precision applications, such as low phase noise microwave oscillators and generators, low sample timing error of high frequency microwaves and millimeter waves, photonic analog-to-digital converters, photonics-based radars, dual-comb ranging, timing synchronization and distribution, and alike.

However, all free-running optical frequency combs exhibit high phase noise at various timescales. Timing variations or irregularity of the optical pulse trains, such as jitter, become important properties for optical frequency comb applications. For example, the general approach to remove or reduce jitter from an optical pulse train in an RF signal generator is to measure the jitter of an optical pulse train as accurately as possible, use that jitter information to correct its effects as precisely as possible, and use that jitter corrected signal to make a very low jitter RF signal generator. However, existing techniques that use an electronic reference can be limited by the poor high frequency offset phase noise of electronic references. Techniques that use an optical reference can be limited by the poor low frequency offset phase noise of optical references. Techniques that use a stabilized continuous-wave reference require ultrahigh quadrature cavities which are extremely fragile and temperature and/or vibration sensitive. Some of the conventional techniques also require multi-staged phase-locked loops for both the repetition rate and the carrier-envelope offset, or complicated subsystems that perform spectral broadening and carrier-envelope offset control.

Many conventional techniques are limited by environmental sensitivity, such as temperature or vibrations through various physical mechanisms. In rougher environments, the amount of requisite isolation increases, posing more challenges to the size and weight of the system. Furthermore, many conventional techniques measures timing irregularities (such as jitter) using an averaging instrument (e.g. the RF spectrum analyzer). However, temporal dependence of the timing error information is lost during averaging, so this information cannot be used to correct the error in real-time. It is thus desirable to obtain a real-time timing error measurement so as to create a signal generator that is more stable.

Figures 12A, 12B, 12C:
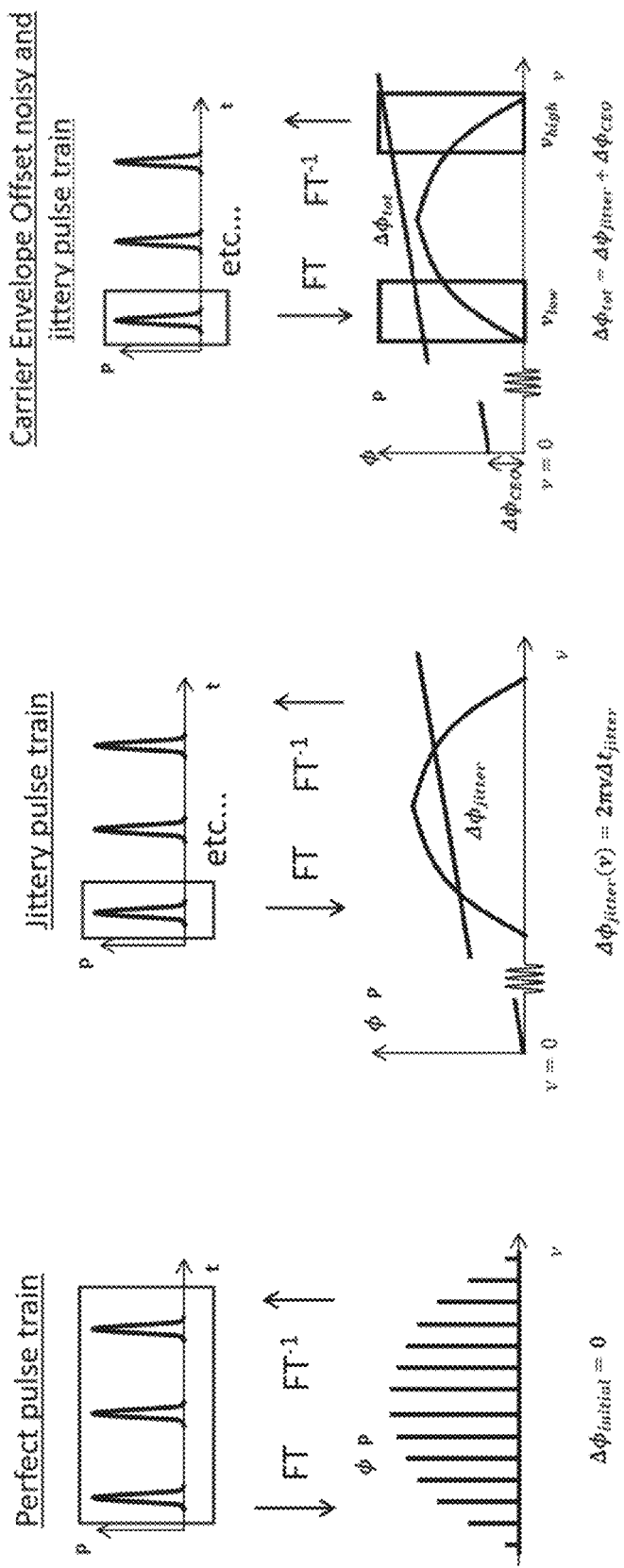
FIG. 12A illustrates a perfect pulse train and its associated optical spectrum
FIG. 12B illustrates an example phase offset caused by jitter in the pulse train.
FIG. 12C illustrates an example phase offset caused by both jitter and carrier envelope offset.

The techniques disclosed herein, among other features and benefits, overcome the above limitations and rely in-part on a digitally corrected optical delay reference. The disclosed embodiments enable precise measurements of timing errors in signals using optical techniques. The examples provided herein, by the way of example and not by limitation, sometimes refer to jitter measurements. It should be understood, however, that the disclosed embodiments are applicable to measuring all types of timing errors, and can be specially beneficial in applications where real-time timing error measurements on a pulse-by-pulse basis is needed for in-situ correction or optimization of signal generation or processing systems. The concept of the digitally corrected delay reference is illustrated using jitter measurements as an example. FIGS. 12A-12C illustrate schematic diagrams of performing jitter measurements. When the pulse has a specific timing component, the pulse demonstrates a phase slope associated with the timing. FIG. 12A illustrates a perfect pulse train and its associated optical spectrum. The initial phase slope in this particular example is 0. In addition to the phase slope, there is also a phase offset caused by any irregularities in the timing component. FIG. 12B illustrates an example phase offset caused by jitter in the pulse train. Furthermore, the phase offset is also related to the carrier envelope offset (CEO) phase. This is the phase of the optical pulse carrier, which can vary independently from the timing of the pulse itself. FIG. 12C illustrates an example phase offset caused by both jitter and carrier envelope offset. When two pulses interfere with each other, the spectral interference pattern encodes the phase differences in the intensity pattern. Given two phase offsets $\Delta\emptyset_{high}$ and $\Delta\emptyset_{low}$ measured at different frequencies, $v_{high}$ and $v_{low}$, respectively, the phase offset caused by carrier envelope offset $\Delta\emptyset_{CEO}$ can be eliminated as follows:

$$\Delta\phi_{high} - \Delta\phi_{low} = (2\pi v_{high} t_{jitter} + \Delta\phi_{CEO}) - (2\pi v_{low} t_{jitter} + \Delta\phi_{CEO}) \quad \text{Eq. (1)}$$
$$= 2\pi(v_{high} - v_{low}) t_{jitter} \quad \text{Eq. (2)}$$

The phase offset caused by jitter can then be determined as:

$$\Delta t_{jitter} = \frac{(\Delta\phi_{high} - \Delta\phi_{low})}{2\pi(v_{high} - v_{low})} \quad \text{Eq. (3)}$$

The different frequency values $v_{high}$ and $v_{blow}$ can be selected using different optical filters. An optical filter is a device that takes in an optical wave and outputs that optical wave with some wavelengths of the spectrum with lower output power than others. For example, an optical filter can pass a contiguous fraction of the input bandwidth, with each of the optical filters passing a different band of wavelengths, e.g. arrayed waveguide gratings, thin-film filters, or fiber Bragg gratings. Many optical filters have multiple outputs, each corresponding to a distinct frequency band of the input. In this document, optical filters are also referred as wavelength division multiplexers (WDMs). In addition to arrayed waveguide gratings and thin-film filters, they can be constructed in multiple ways, including but not limited to: a coupler followed by single output filters on each output, a set of reflective filters can be combined with circulator, such that the reflection from one filter is circulated to the next filter. The filters can be selected so that they can cover the optical spectrum of the train of pulse while maintaining sufficient separation of the frequencies. Phase offsets caused by other types of timing variations or irregularities can be determined in a similar fashion.

Figure 13A:
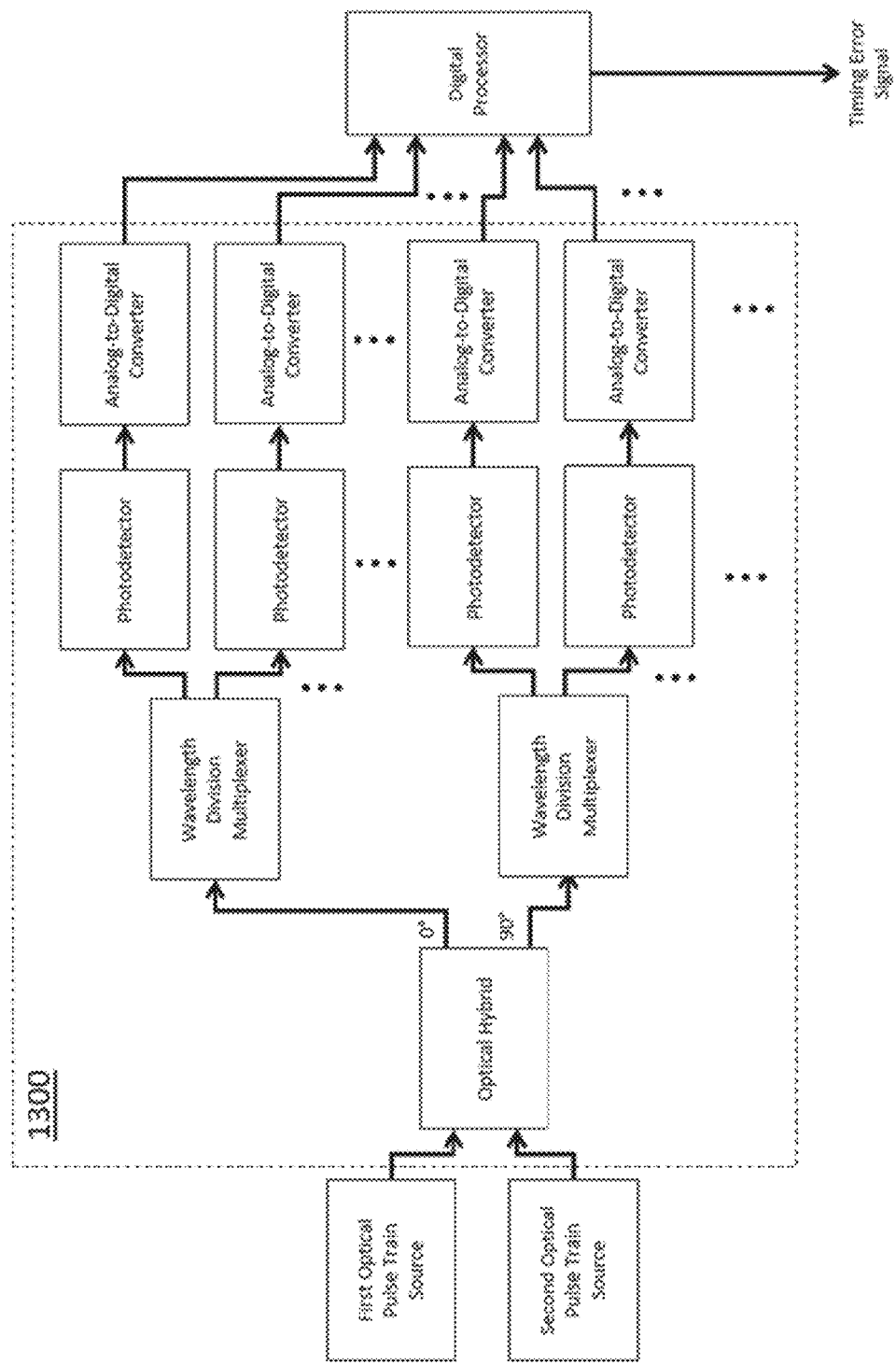
FIG. 13A illustrates an example timing measurement apparatus in accordance with the present technology.

FIG. 13A illustrates an example timing measurement apparatus 1300 in accordance with the present technology. The apparatus 1300 accepts two inputs into an optical hybrid device. The optical hybrid is a device that can include a number of beam splitters and one or more quarter-wave plates. The optical hybrid includes at least two inputs and at least two outputs such that the two inputs are interfered at each output, with a phase difference between the inputs that is different for each output. For example, the device can produce 0 and 90-degree phase difference outputs, or 0, 90, 180, and 270-degree outputs. In some embodiments, the phase difference between the outputs can have values other than 90°.

In this embodiment, the optical hybrid generates two outputs whose phases are shifted 90 degrees from each other (e.g., 0° and 90° outputs). The two outputs of the optical hybrid are fed into wavelength division multiplexers (e.g., optical filters). The outputs of each wavelength division multiplexer (e.g., $v_{high}$ and $v_{low}$) are fed into photodetectors to convert optical signals into radio-frequency (RF) signals. The RF outputs from the photodetectors are then digitized using analog-to-digital converters.

The digital signals output from the timing measurement apparatus can be fed into a digital processor to calculate a pulse pair phase difference at each wavelength. In some embodiments, the digital processor is a part of the timing measurement apparatus. In general, at least some of the components in FIG. 13A (as well as other figures in this patent document) can be implemented as part of the timing measurement device, or as separate components and/or at remote locations with respect to other components of the system. For example, in some embodiments, the digital processor is a separate component implemented outside of the timing measurement apparatus. Similarly, the analog-to-digital converters or even, in some instances, the photodetectors can be implemented as separated components.

Figure 13B:
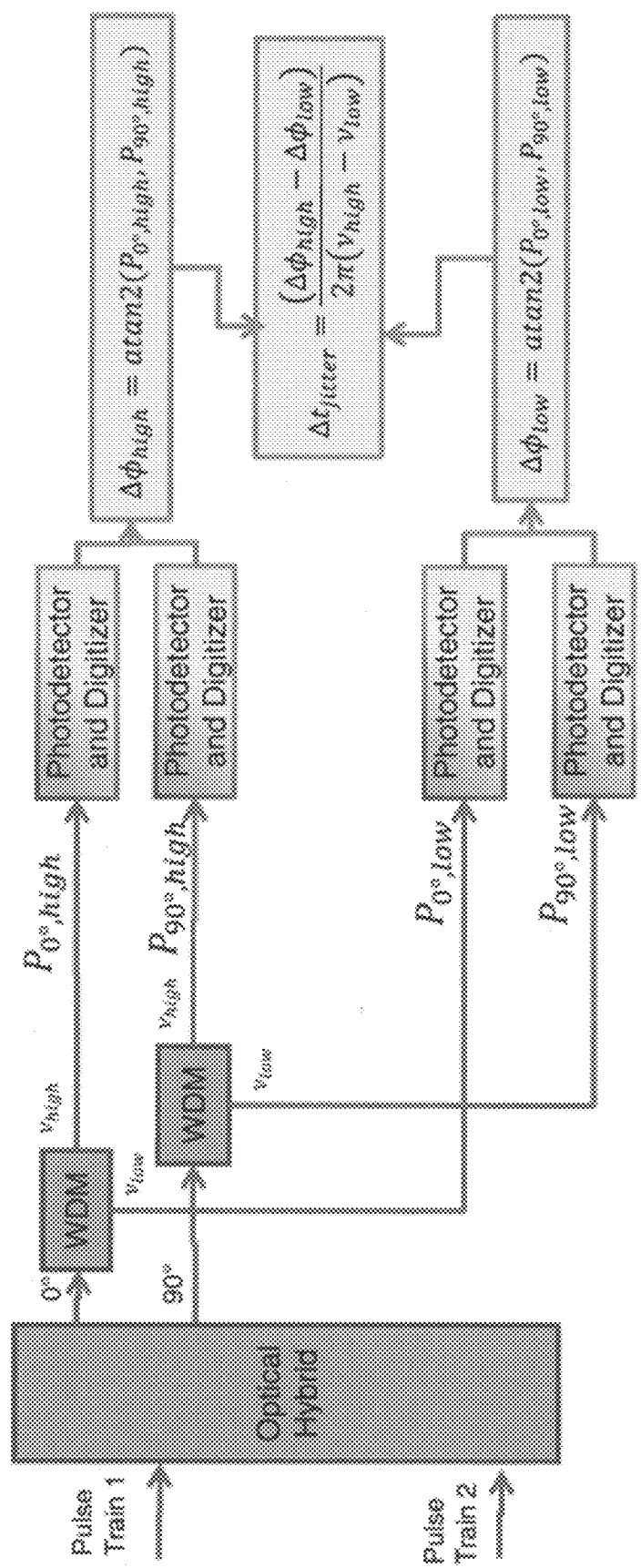
FIG. 13B illustrates a different example version of a timing measurement apparatus in accordance with the present technology.

FIG. 13B illustrates a different version of a timing measurement apparatus in accordance with the present technology to provide better understanding of the phase offset calculations. The phase offset $\Delta\varnothing_{high}$ can be obtained as:

$$\Delta\varnothing_{high} = a\tan 2(P_{0°,high}, P_{90°,high}) \quad \text{Eq. (4)}$$

The phase offset $\Delta\varnothing_{low}$ can be obtained as:

$$\Delta\varnothing_{low} = a\tan 2(P_{0°,low}, P_{90°,low}) \quad \text{Eq. (5)}$$

The phase offset caused by timing error (e.g., jitter) can then be determined according to Eq. (3). As shown in Eq. (3), the pulse pair phase differences at each wavelength for the same original pulse are subtracted to eliminate the carrier envelope offset phase. The result can be scaled by the optical frequency difference between phases from any pair of wavelengths to yield the time difference between the pulses.

Figure 14A:
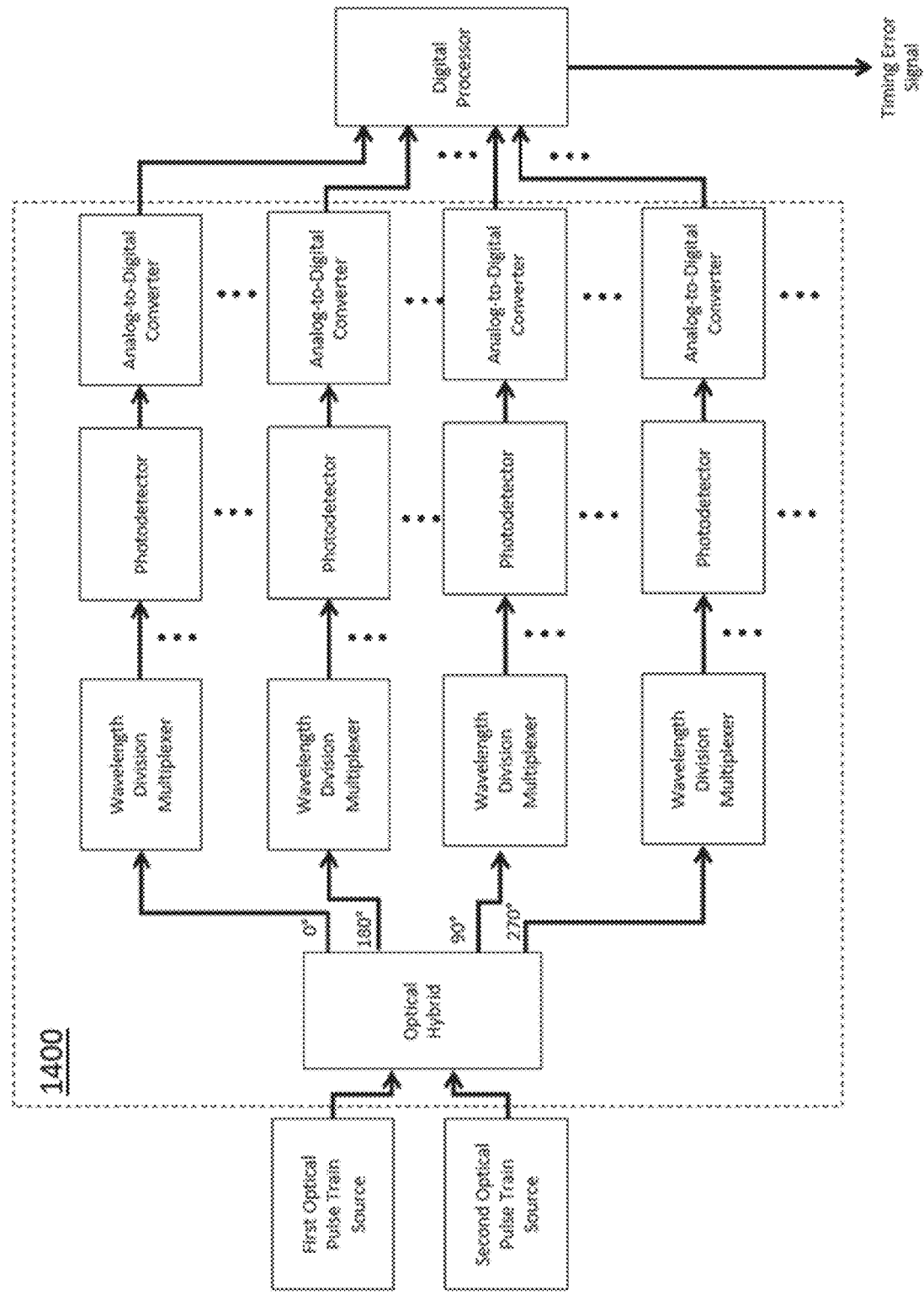
FIG. 14A illustrates another example timing measurement apparatus in accordance with the present technology.

FIG. 14A illustrates another example timing measurement apparatus 1400 in accordance with the present technology. The apparatus 1400 accepts two inputs into an optical hybrid device. The optical hybrid generates four outputs whose phases are shifted 90 degrees from each other (e.g., 0°, 90°, 180°, and 270° outputs). The four outputs of the optical hybrid are fed into wavelength division multiplexers. The outputs of each wavelength division multiplexer (e.g., $v_{high}$ and $v_{low}$) are fed into photodetectors to convert optical signals into radio-frequency (RF) signals. The RF outputs from the photodetectors are digitized using analog-to-digital converters.

The digital signals output from the timing measurement apparatus are fed into a digital processor. Similar to the embodiment shown in FIG. 13, some of the apparatus components, such as the digital processor, can be a part of the timing measurement apparatus or a separate component implemented outside of the timing measurement apparatus. The digital processor calculates the difference between the 0° and 180° pulses from each frequency band as well as the 90° and 270° outputs from each frequency band. The two differences are fed as inputs into the pulse pair phase difference algorithm.

Figure 14B:
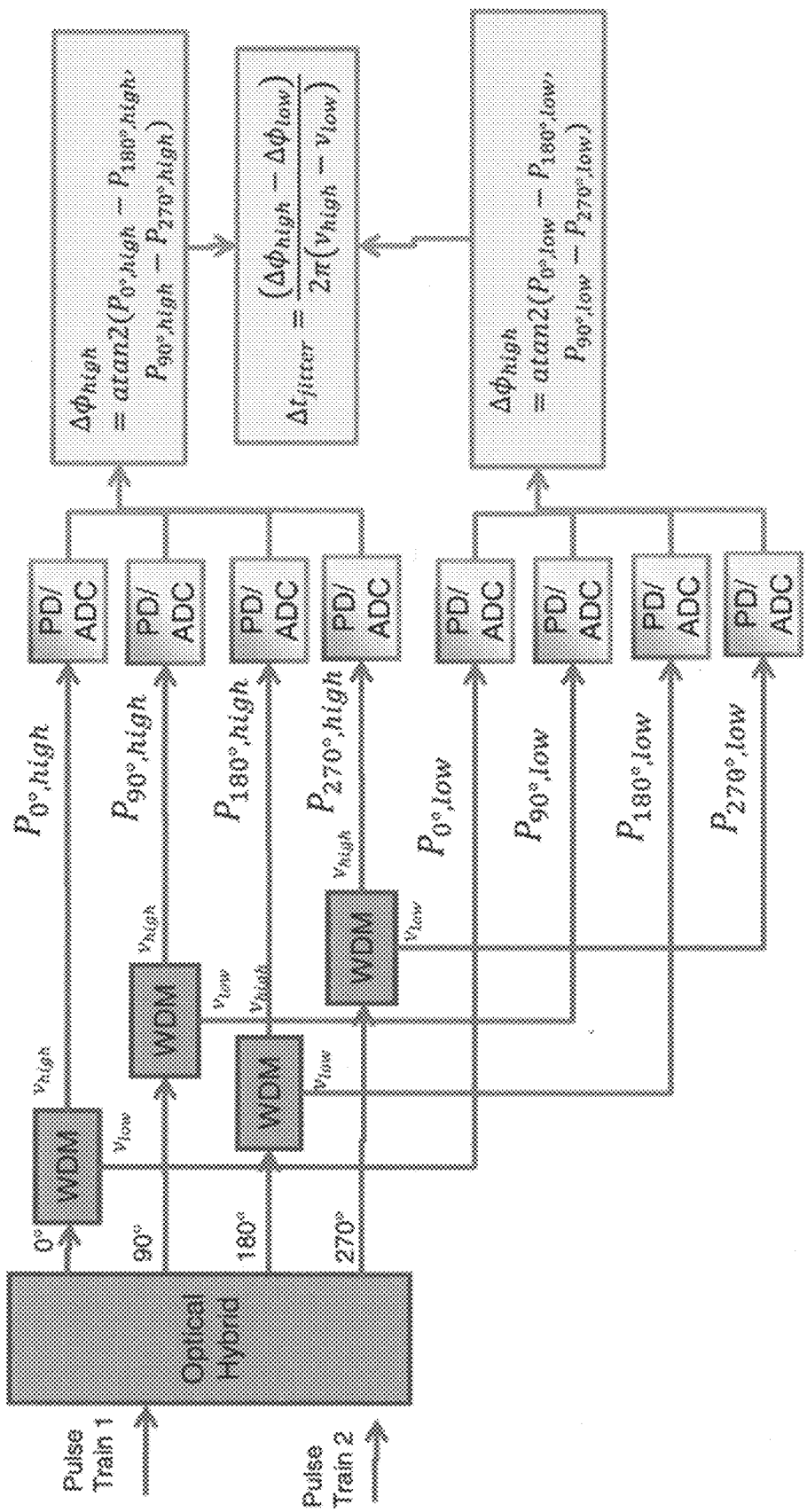
FIG. 14B illustrates a different example version of a timing measurement apparatus in accordance with the present technology.

FIG. 14B illustrates a different version of a timing measurement apparatus in accordance with the present technology to provide better understanding of the phase offset calculations. The phase offset $\Delta\varnothing_{high}$ can be obtained as:

$$\Delta\varnothing_{high} = a\tan 2(P_{0°,high} - P_{180°,high}, P_{90°,high} - P_{270°,high}) \quad \text{Eq. (6)}$$

The phase offset $\Delta\varnothing_{low}$ can be obtained as:

$$\Delta\varnothing_{low} = a\tan 2(P_{0°,low} - P_{180°,low}, P_{90°,low} - P_{270°,low}) \quad \text{Eq. (7)}$$

The phase offset caused by timing error (e.g., jitter) can then be determined according to Eq. (3).

Figure 15A:
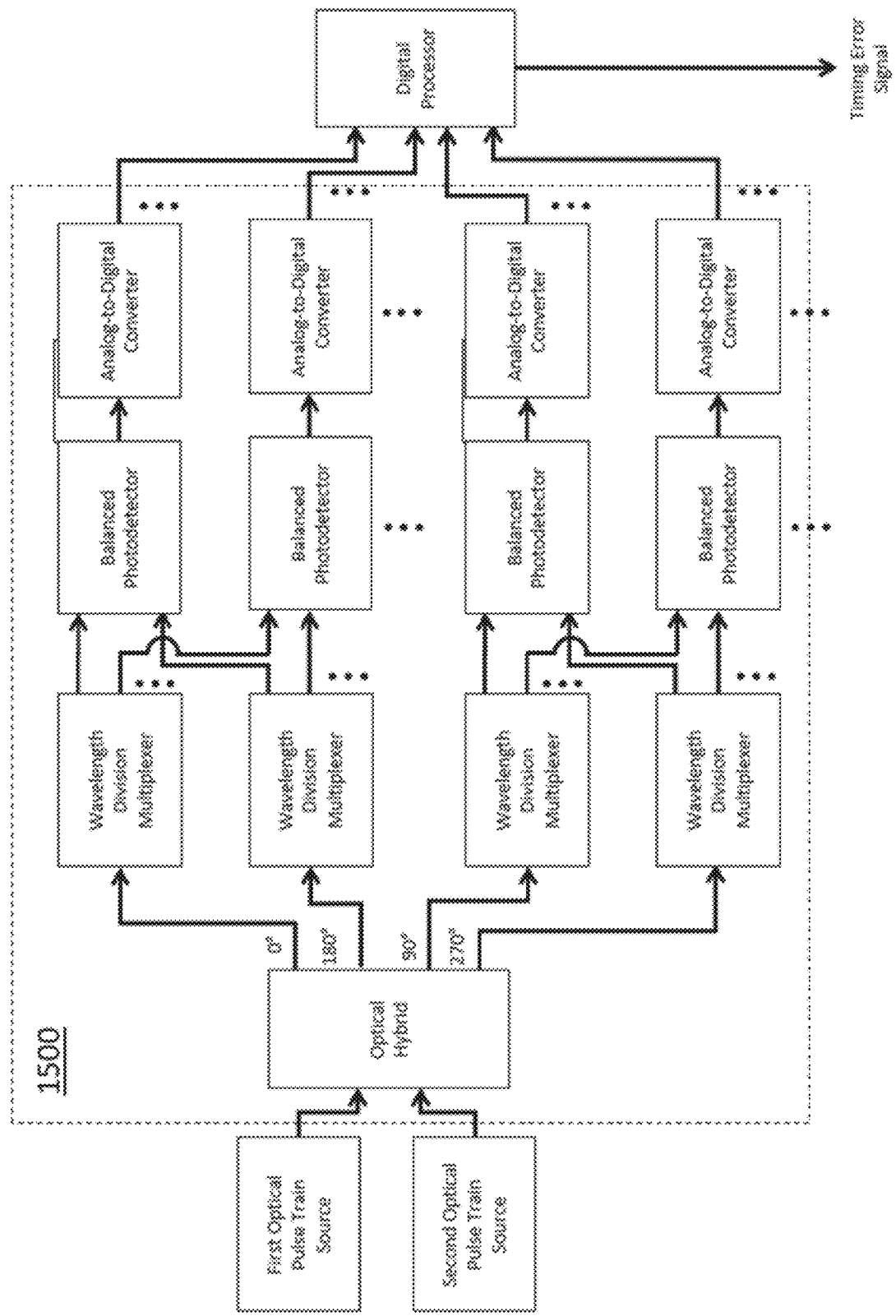
FIG. 15A illustrates another example timing measurement apparatus in accordance with the present technology.

FIG. 15A illustrates another example timing measurement apparatus 1500 in accordance with the present technology. The apparatus 1500 accepts two inputs into an optical hybrid device. The optical hybrid generates four outputs whose phases are shifted 90 degrees from each other (e.g., 0°, 90°, 180°, and 270° outputs). The 0° and 180° pulses from the optical hybrid are directed to two WDMs. Outputs from the same frequency band of the 0° and 180° pulses are directed into one set of balanced photodetectors. Likewise, outputs from the same frequency band of the 90° and 270° pulses are directed into another set of balanced photodetectors.

Figure 15B:
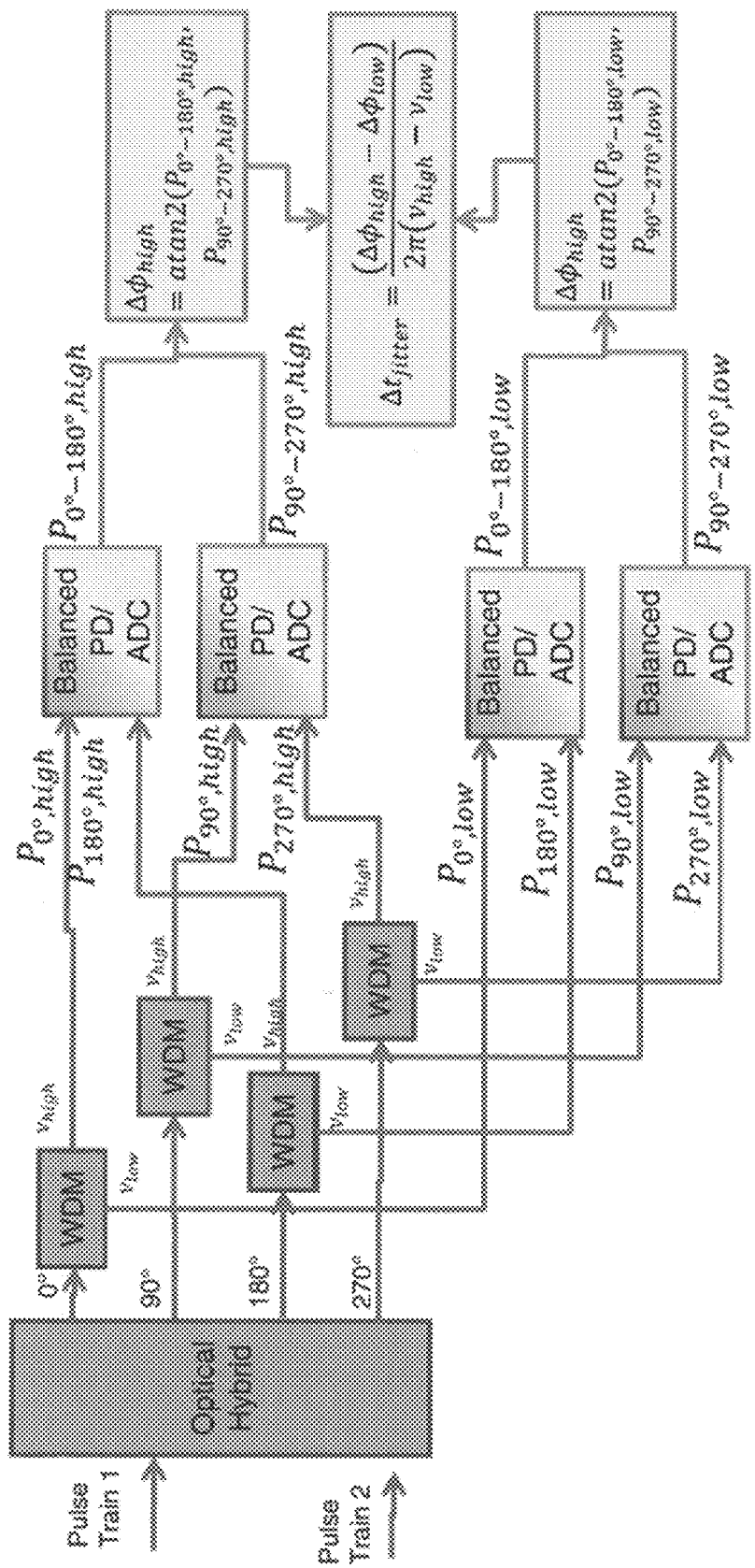
FIG. 15B illustrates a different example version of a timing measurement apparatus in accordance with the present technology.

FIG. 15B illustrates a different version of a timing measurement apparatus in accordance with the present technology. The phase offset $\Delta\varnothing_{high}$ can be obtained as:

$$\Delta\varnothing_{high} = a\tan 2(P_{0°-180°,high}, P_{90°-270°,high}) \quad \text{Eq. (8)}$$

The phase offset $\Delta\varnothing_{low}$ can be obtained as:

$$\Delta\varnothing_{low} = a\tan 2(P_{0°-180°}, P_{90°-270°,low}) \quad \text{Eq. (9)}$$

The phase offset caused by timing error (e.g., jitter) can then be determined according to Eq. (3).

Figure 16:
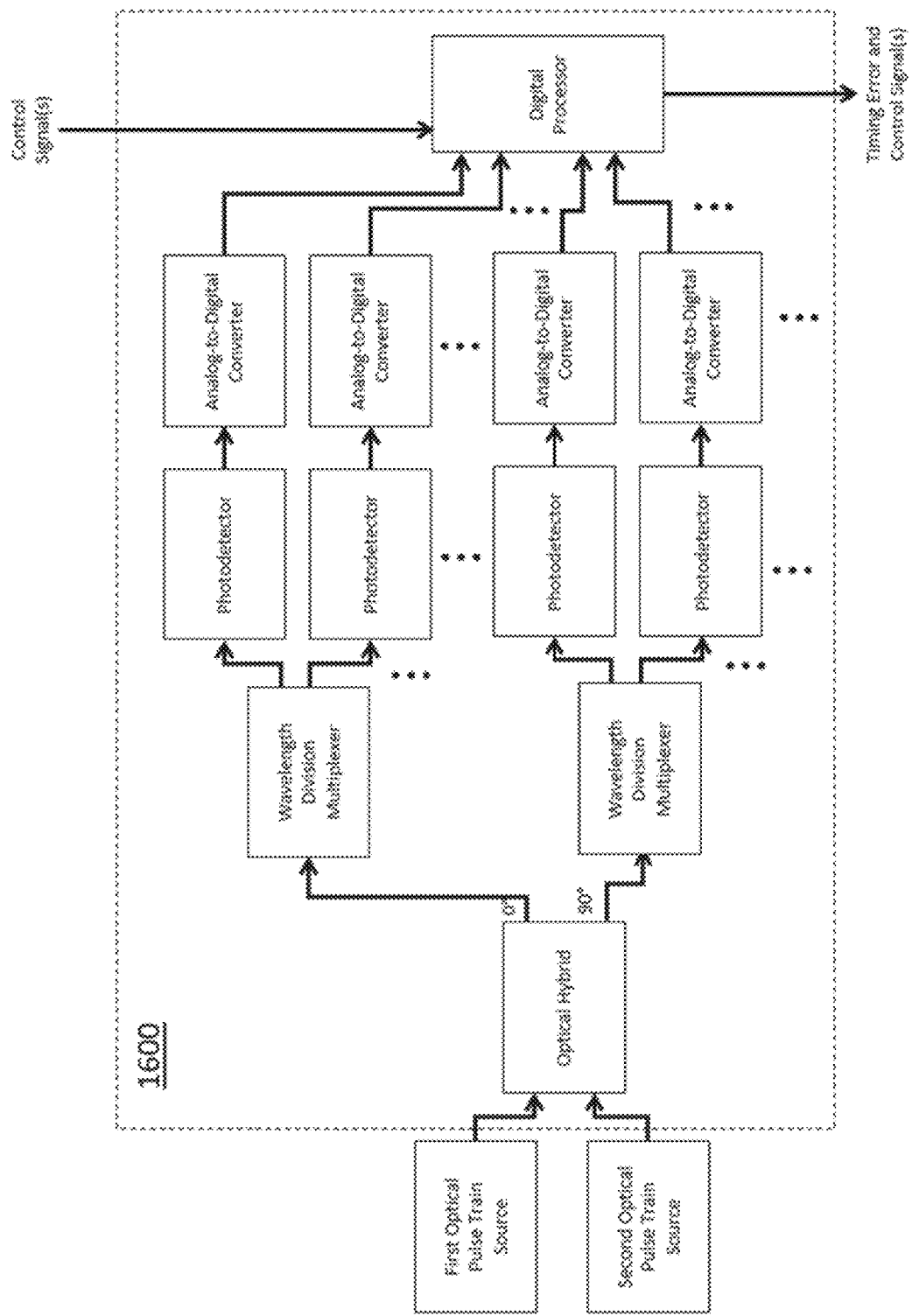
FIG. 16 illustrates yet another example timing measurement apparatus in accordance with the present technology.

FIG. 16 illustrates yet another example timing measurement apparatus 1600 in accordance with the present technology. In this embodiment, the timing measurement apparatus 1600 is similar to the apparatus 1300 in FIG. 16 but is illustrated as including the digital processor as part of the apparatus. In addition, the digital processor receives not only the digital signals from the analog-to-digital converters but also one or more control signals. The one or more control signals can be used to account for timing offsets or timing error compensation, can be signals associated with environmental and external factors, such as temperature, vibrations or other channel information. The digital processor can use such control signal to correct or compensate for such timing or environmental factors.

Figure 17:
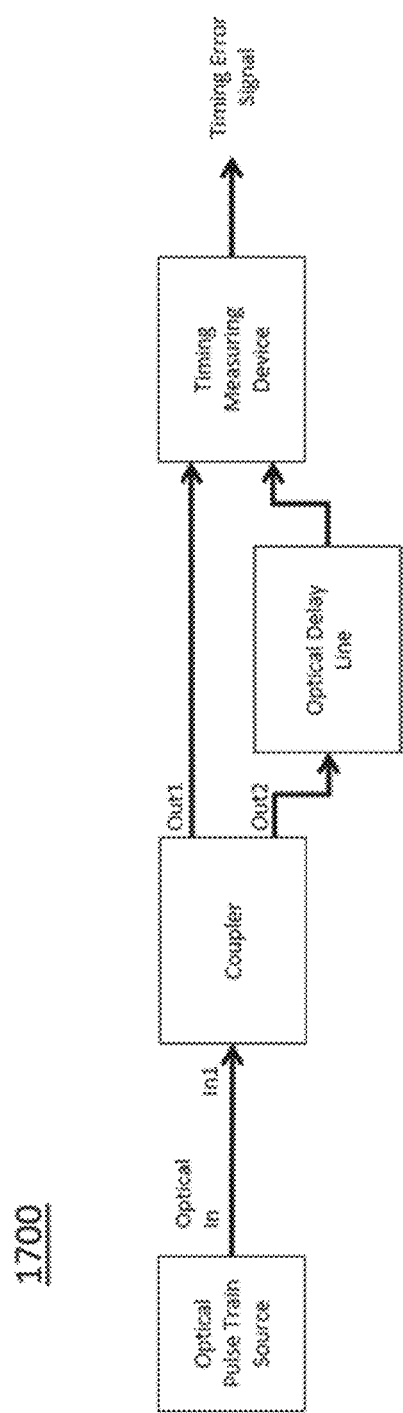
FIG. 17 illustrates an example architecture of a timing measurement system in accordance with the present technology.

FIG. 17 illustrates an example architecture of a timing measurement system 1700 in accordance with the present technology. As shown in FIG. 17, a pulse source generates an optical pulse train. The optical pulse train is then provided to a coupler. The coupler is a device that splits the input optical wave (or combines two input optical waves from two ports) into two output optical waves at ports Out1 and Out2, each with a fraction of the power of the input(s). The coupler can maintain the polarization state of the input for optimal operation. In this embodiment, one of the outputs of the coupler is directed into a timing measurement device directly. The other output of the coupler is fed into the timing measurement device (such as those shown in example configurations of FIGS. 13 to 16) via an optical delay component. The optical delay component can be a polarization maintaining optical fiber, such as an integrated photonic optical delay line (e.g. silicon photonic, planar lightwave circuit, InP, GaAs, etc.). The length of the optical delay can be chosen to overlap pulses that are N≥1 periods apart.

Figure 18:
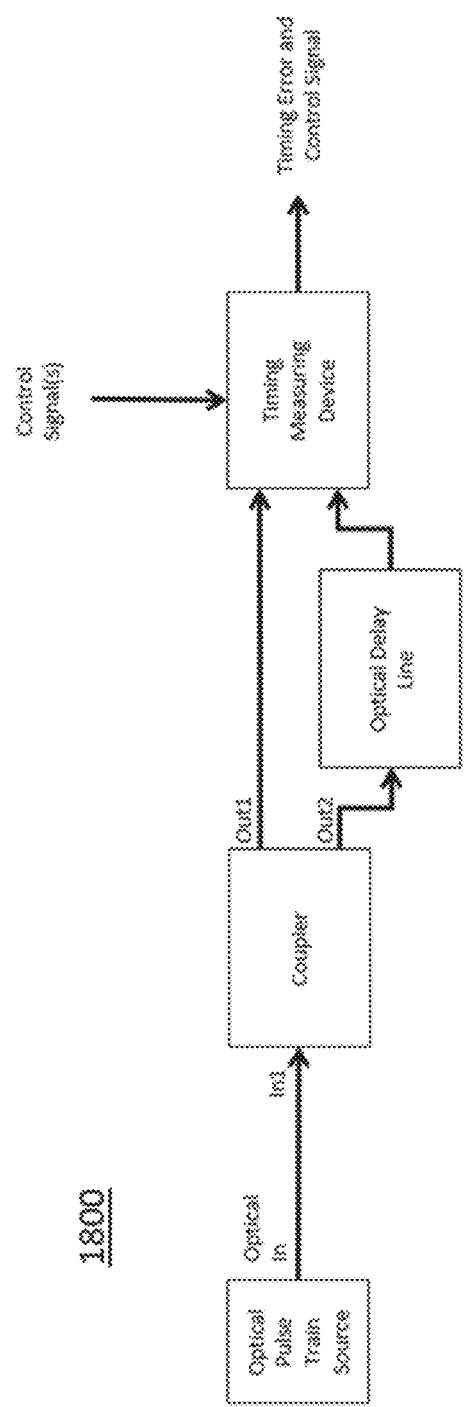
FIG. 18 illustrates another example architecture of a timing measurement system in accordance with the present technology.

FIG. 18 illustrates another example architecture of a timing measurement system 1800 in accordance with the present technology. In this embodiment, the timing measurement system 800 accepts one or more control signals so that a timing offset can be added to the timing error signal. In both embodiments shown in FIG. 17 and FIG. 18, the optical hybrid, which is a part of the timing measurement device, eliminates the need for a phase locked loop and repetition rate tunable laser as used in some of the conventional techniques. The timing error information can be recorded in the digital form so that it can be used for compensation or combined with other subsequent processing. In some embodiments, the average peak of the pulses from the photodetectors can be aligned to the sample time of the digitizer, whose sample rate is equal to the pulse repetition rate.

Figure 19:
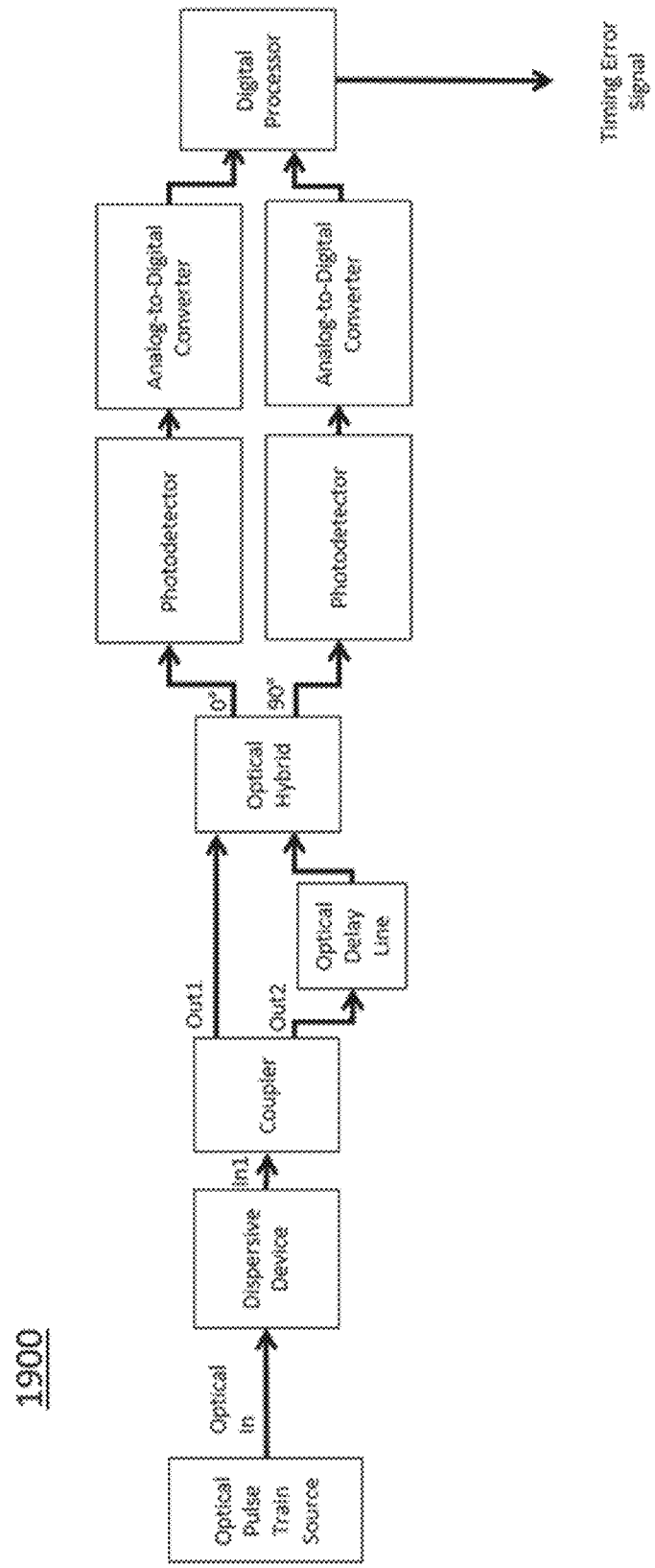
FIG. 19 illustrates another example architecture of a timing measurement system in accordance with the present technology.

FIG. 19 illustrates another example architecture of a timing measurement system 1900 in accordance with the present technology. This embodiment can be implemented when the digitizer sample rate is higher than the pulse repetition rate, and the multiple samples on each pulse correspond to the multiple optical frequencies of the pulse. The timing measurement system 1900 here includes a dispersive device that separates each pulse's optical frequencies temporally. The system 1900 then aligns the average peak of the pulses from the photodetectors to the sample time of the digitizers. The outputs from the optical hybrid are fed directly to the photodetectors, thereby removing the need for additional photodetectors and digitizers. Alternatively, multiple dispersive devices can be used to connect the outputs from the optical hybrid to the photodetectors. The pulses are temporally aligned either in the analog domain (e.g., using optical delay lines) or in the digital processor with a shift (e.g. using circshift). The digital processor then processes the samples corresponding to the same pulse. The phase offset $\Delta\emptyset(n, m)$ as a function of pulse number n and sample point within a single pulse m can be obtained as:

$$\Delta\emptyset(n,m) = a\tan 2(P_0°(n,m), P_{90}°(n, m)) \qquad \text{Eq. (10)}$$

In some embodiments, a line can be fit to the independent variable optical frequency ω, which is related to sample number m by the frequency-time mapping, and dependent variable $\Delta\emptyset(n, m)$, for a single pulse, yielding an intercept and slope for each pulse. The timing error can be deemed as being proportional to the slope of this line.

Figure 20:
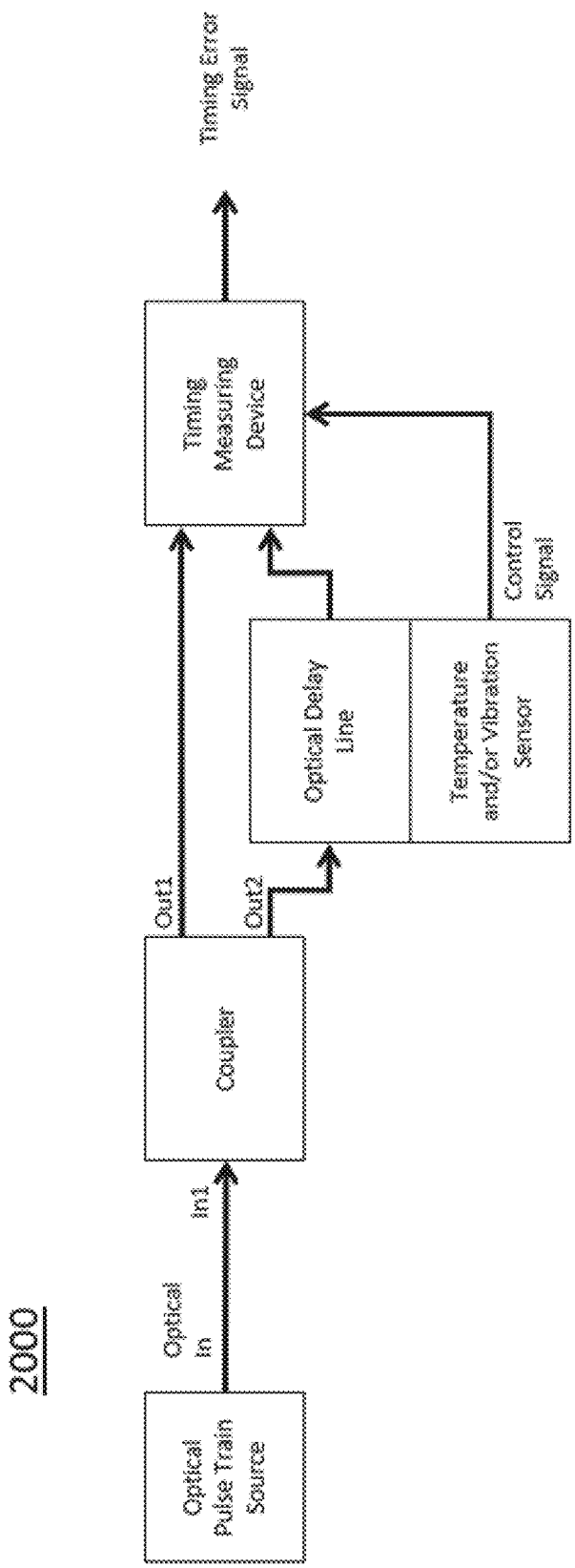
FIG. 20 illustrates an example architecture of a timing measurement system that reduces environmental dependency in accordance with the present technology.

Typically, optical delay lines have temperature and vibration dependency. FIG. 20 illustrates an example architecture of a timing measurement system 2000 that reduces environmental dependency in accordance with the present technology. The timing measurement system 2000 adds a temperature and/or vibration sensor onto the optical delay line so that information from the sensor can be used to digitally remove or reduce optical delay variations caused by environmental fluctuations on the timing error measurement.

Figure 21:
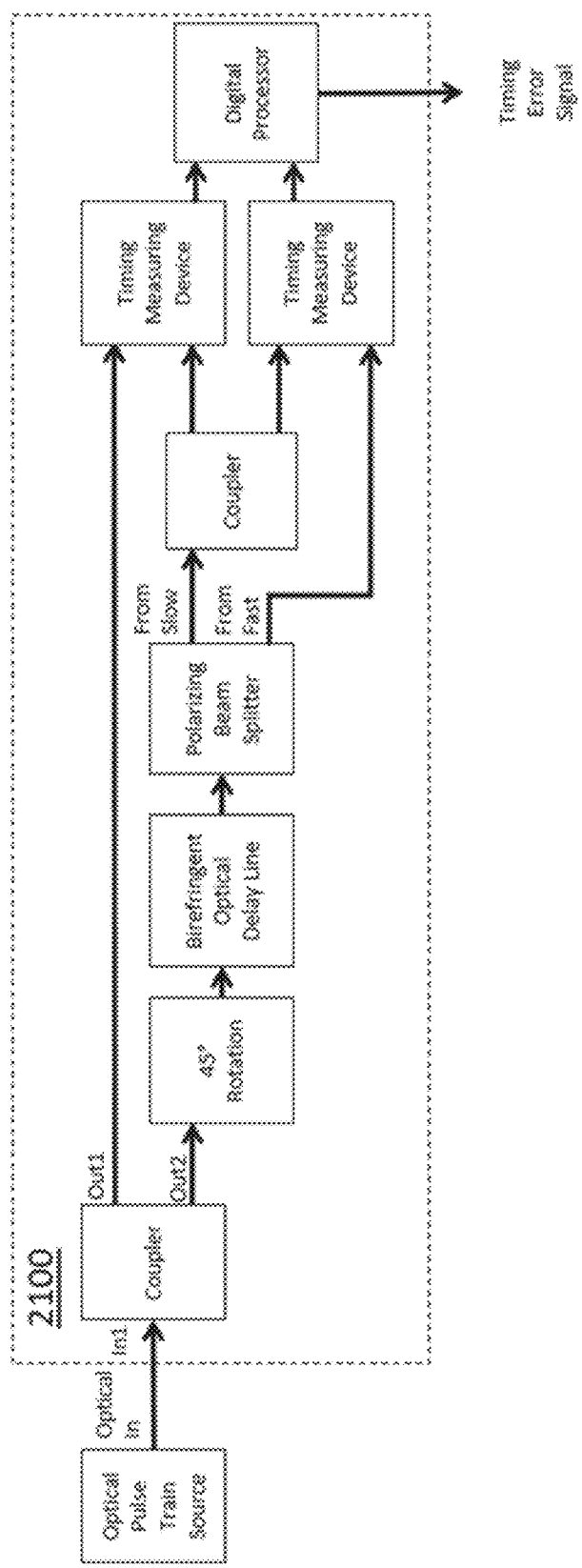
FIG. 21 illustrates another example architecture of a timing measurement system in accordance with the present technology.

FIG. 21 illustrates another example architecture of a timing measurement system 2100 in accordance with the present technology. In this embodiment, the optical pulse train is coupled into a first coupler to create two copies: Out1 and Out2. The first copy, Out1, is transmitted directly into a first timing measurement device. The second copy, Out2, is fed into both polarizations of a birefringent optical delay line that maintains polarization. In some embodiments, the polarizations are created by a polarization rotator, such as a 45-degree splice that sends linearly polarized light half into each polarization, that is placed between the coupler and the birefringent optical delay line. The optical signal from the optical delay line is then fed into a polarizing beam splitter that separates light that travels through the slow and fast axes of the birefringent optical delay line. Light from one axis (e.g. slow) is sent to a second coupler. One output of the second coupler is fed into the first timing measurement device, whose other input receives the first copy of the first optical pulse train Out1. The other output of the second coupler and light from the other axis (e.g. fast) from the beam splitter are fed into a second timing measurement device.

The first timing error signal $t_{TMD1}(n)$ as a function of measurement number n from the first timing measurement device is between pulses that are many pulse periods (M) apart, and the delay is proportional to temperature changes $\Delta T(n)$ that vary with measurement number n and with coefficient $K_1$ that is independent of n due to changes in the delay line's length and group index from temperature changes. The second timing error $t_{TMD2}(n)$ from the second timing measurement device is between pulses that are a few pulse periods (N) apart, and the delay is proportional to a temperature change $\Delta T(n)$ with coefficient $K_2$ that is independent of n due to changes in the delay line's length and birefringence. Both signals are sensitive and linearly proportional to temperature, yielding a linear system with two equations (relationship between temperature change and single or dual polarization delay) and two unknowns (temperature change and delay between each far apart pulse pair).

$$t_{TMD1}(n) = M\Delta t(n) + t_1 + K_1 \Delta T(n) \qquad \text{Eq. (11)}$$

$$t_{TMD2}(n) = N\Delta t(n) + t_2 K_2 \Delta T(n) \qquad \text{Eq. (12)}$$

where $\Delta t(n)$ is the timing difference between adjacent pulses, averaged over M pulses; $t_1$ and $t_2$ can be freely chosen, e.g. such that for the first measurement point n=1, $\Delta t(1)=0$ and $\Delta t(1)=0$ for both equations; regardless, $t_1$ and $t_2$ do not vary with n. As long as the ratio of the timing changes to temperature is different from the ratio of number of pulse periods apart (which is the case for standard polarization maintaining fiber), the system of equations Eq. (11) and Eq. (12) is invertible. Solving that system yields the delay between pulses from the optical pulse train.

Figure 22:
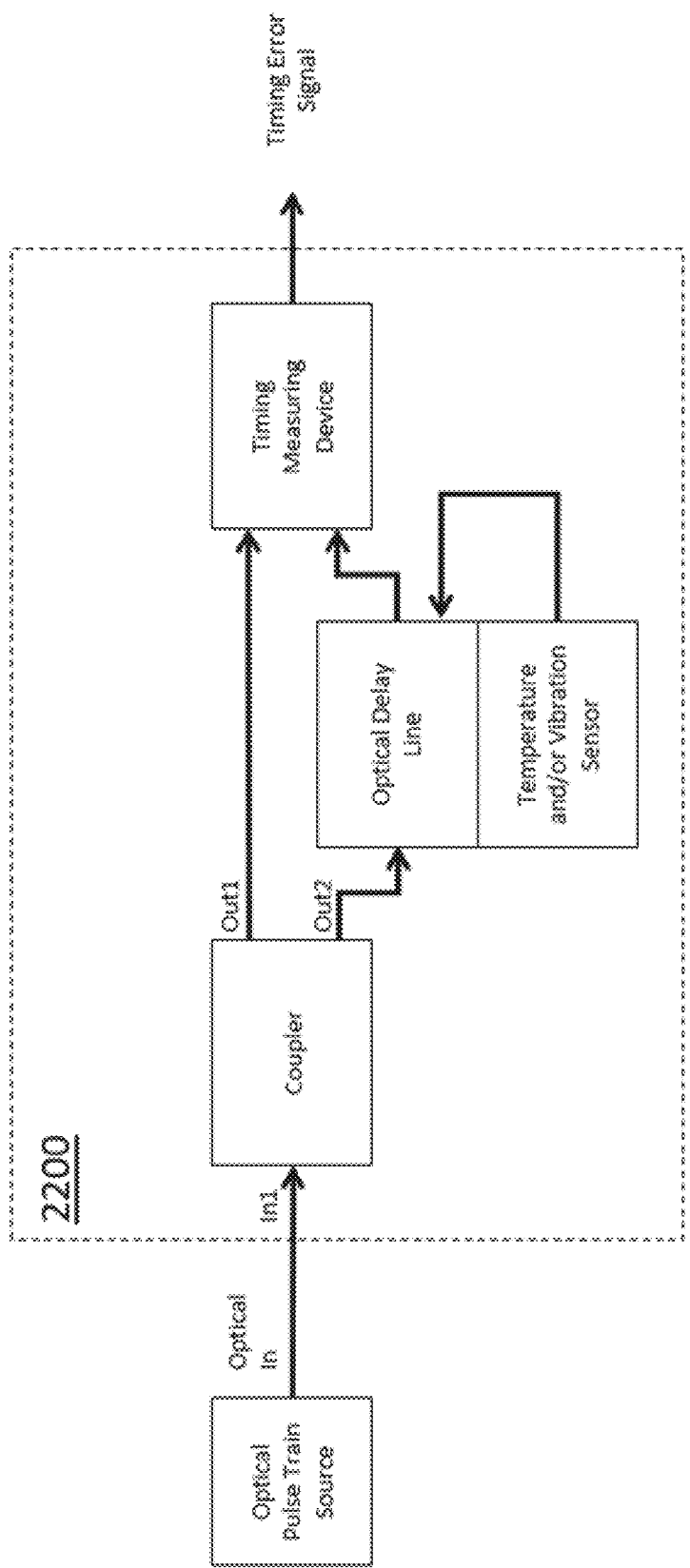
FIG. 22 illustrates another example architecture of a timing measurement system in accordance with the present technology.

FIG. 22 illustrates another example architecture of a timing measurement system 2200 in accordance with the present technology. In this embodiment, the timing measurement system 2200 can stabilizes the optical delay line using a temperature and/or vibration sensor. Information from the temperature and/or vibration sensor can create a compensational signal along the optical delay line. The compensation signal can be sent to a delay line adjustment device, e.g. a fiber stretcher, a heater, or a tunable optical delay line placed before or after the optical delay line to perform the stabilization.

In some embodiments, the optical delay line is nominally a polarization maintaining optical fiber. In order to get high extinction in the outputs of the optical hybrids, the dispersion is minimized by either using a low dispersion fiber or using multiple types of fiber with opposite signs of dispersion to cancel out the total dispersion of the delay. Some embodiments of an optical delay line include an integrated photonic optical delay line (e.g. silicon photonic, planar lightwave circuit, InP, GaAs, etc.).

In some embodiments, the optical hybrid is a device with at least two inputs, and at least two outputs, such that the two inputs are interfered at each output, with a phase difference between the inputs that is different for each output. Nominally, the device would have 0 and 90-degree phase difference outputs (90-degree optical hybrid), or 0, 90, 180, and 270-degree outputs. In addition, they could have phase differences besides 90 degrees between the outputs, as long as there is a phase difference between outputs.

In some embodiments, the optical filter is a device that takes in an optical wave and outputs that optical wave with some wavelengths of the spectrum with lower output power than others. Here, the nominal optical filters pass a contiguous fraction of the input bandwidth, with each of the optical filters passing a different band of wavelengths, e.g. arrayed waveguide gratings, thin-film filters, or fiber Bragg gratings. Many optical filters have multiple outputs, each corresponding to a distinct wavelength band of the input, and hereafter are referred to as wavelength division multiplexers (WDMs). In addition to arrayed waveguide gratings and thin-film filters, WDMs can be constructed in multiple ways, including but not limited to: a coupler followed by single output filters on each output, and a set of reflective filters combined with a circulator such that the reflection from one filter is circulated to the next filter.

In some embodiments, the photodetector is a device that takes in an optical wave and outputs an RF wave. Nominally it is an InGaAsP photodiode, but other implementations may also be used. The analog-to-digital converters converts the RF waveforms into digital streams. The sample period of the analog-to-digital converter is nominally equal to the nominal period of the optical pulse train. The digital processor takes the digital streams and performs calculations on those streams to produce further digital streams. The digital processor may be a FPGA, GPU, CPU, or other similar digital processor, along with the associated electronics needed for its operation. Some embodiments may show one more digital processors; the processor may be consolidated if needed, or expanded in number if needed.

The embodiments described in the present document may have one or more of the following: a coupler, a digital to analog converter, one or more optical dispersive devices, temperature sensors, and vibration sensors.

In some embodiments, dispersive devices separate the wavelengths of the optical pulse train in time, and may nominally be optical fibers, especially dispersion compensating fibers, or chirped fiber Bragg gratings.

In some embodiments, temperature sensors could be standard electronically readable temperature meters (e.g. thermocouples, thermistors, resistance temperature detectors, or integrated circuit sensors), or an in-situ optical temperature sensor. The in-situ optical temperature sensor measures the change in optical delay with temperature, and could be any of the ones used in the field of fiber optic sensing, especially as used in civil engineering applications. In an example, the physical mechanism of a temperature sensor may use the temperature dependence of birefringence of polarization maintaining optical fibers.

In some embodiments, the vibration sensor could be an electronic accelerometer (e.g. MEMS or piezoelectric based), or an in-situ optical vibration sensor. The in-situ optical vibration sensor could be any of the ones used in the field of fiber optic sensing, especially as used in civil engineering applications.

Figure 23:
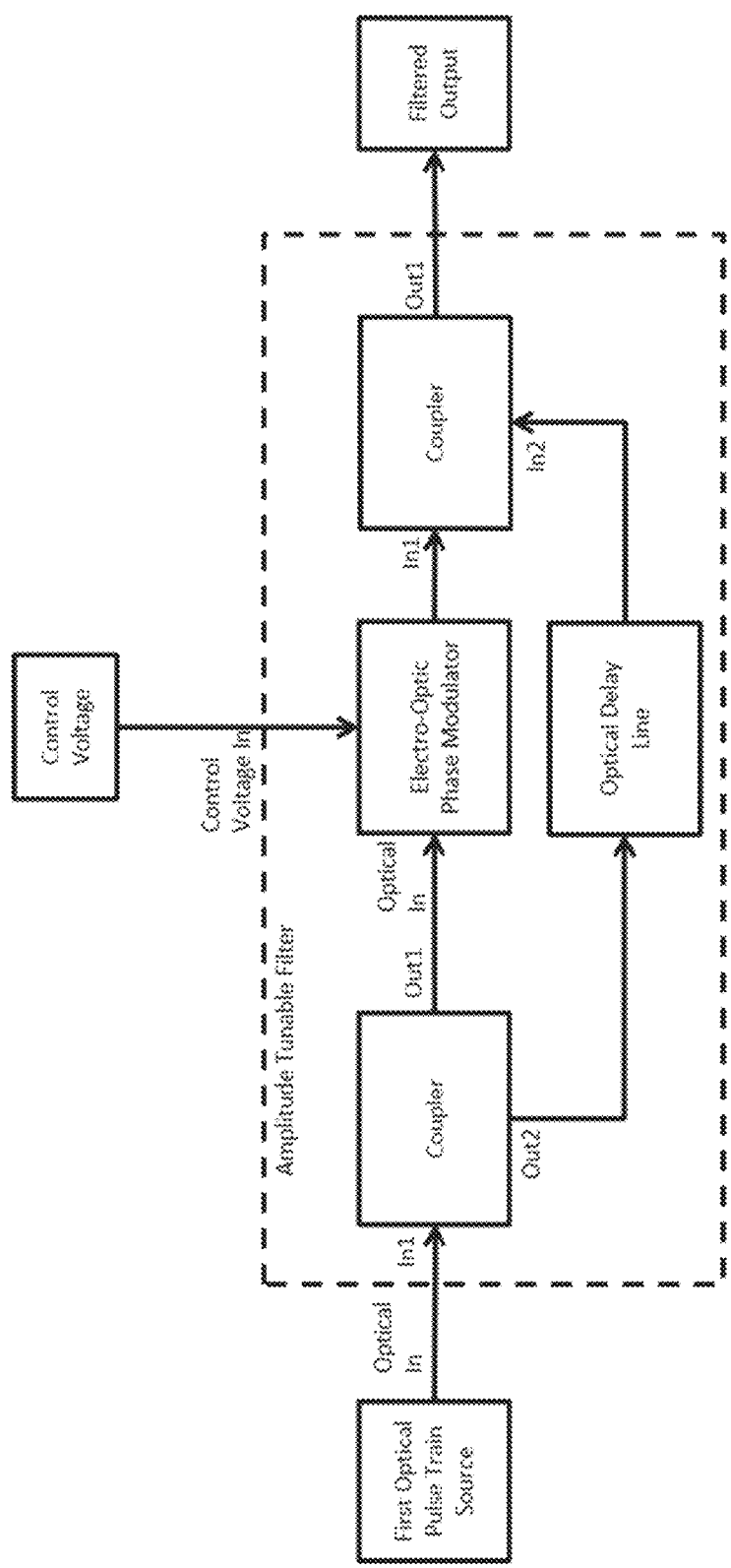
FIG. 23 is a block diagram representation of an example phase-only VTOF.

FIG. 23 illustrates an example phase-only VTOF that is created with a coupler, an electro-optic phase modulator, and a second coupler. Although VTOF embodiments have been described as using a Mach-Zehnder Interferometer topology, interferometer topologies besides the Mach-Zehnder can also be used, e.g. Sagnac or Michelson. This applies to the amplitude-only VTOF as well as the amplitude and phase VTOF.

Figure 24:
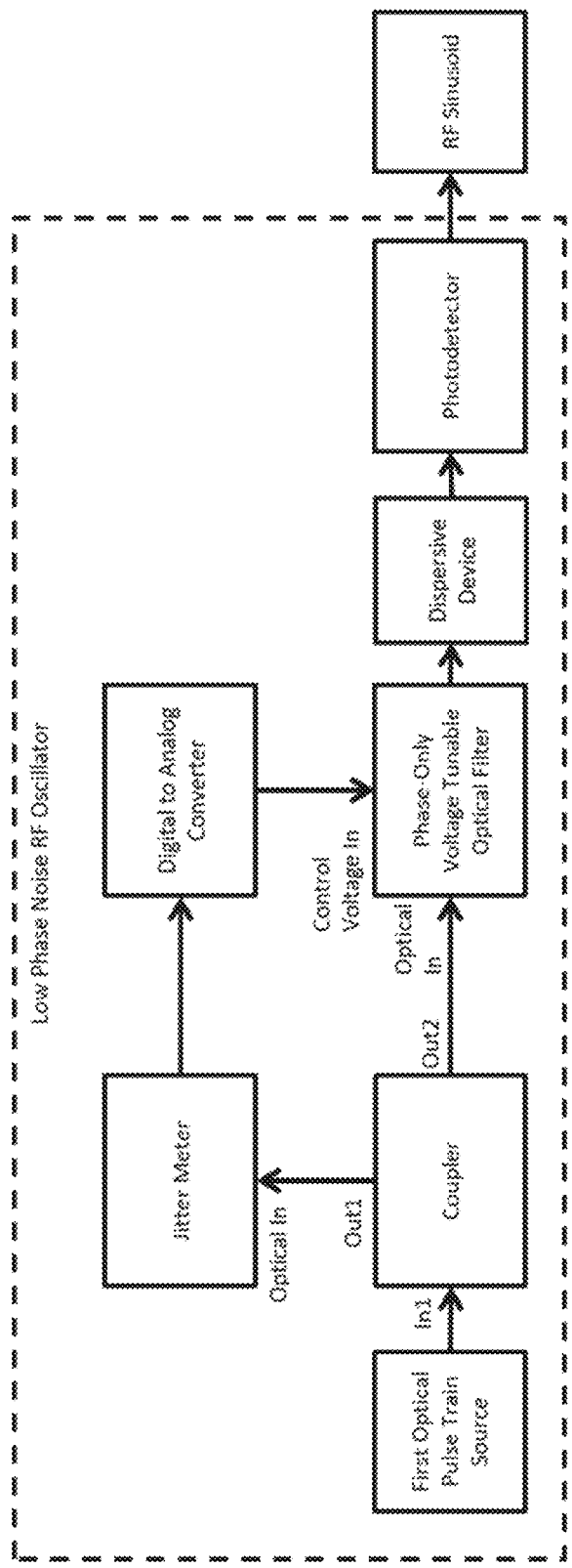
FIG. 24 is a block diagram representation of an example low-phase noise RF oscillator, in accordance with some embodiments of the disclosed technology.

Some embodiments of the jitter meter subsystem can further include a pulsed optical train source, a digital processor, a digital-to-analog converter, a phase-only VTOF, and a dispersive device, to form a nominal low phase noise RF oscillator, as illustrated in FIG. 24. The example embodiment illustrated therein (1) splits the pulsed optical train into two waves with a coupler (for example), (2) measures the jitter on one of the two waves with a jitter meter, calculates a digital jitter compensation signal in the signal processor, and generates an RF jitter compensation signal through the digital-to-analog converter, (3) sends the other wave to the voltage tunable optical filter, (4) applies the jitter compensation RF analog signal to the voltage tunable optical filter, and (5) sends the output of the voltage tunable optical filter to a photodetector and bandpass filter, the output of which is a low phase noise RF sinusoid.

The embodiment illustrated in FIG. 24 suppresses the transfer of phase noise from the digital-to-analog converters to the low phase noise RF sinusoid when (1) the jitter compensation RF analog signal is a staircase waveform (e.g., a series nominally constant voltages transitions between those voltages relatively fast) and (2) the optical pulses are short compared to the pulse period. The jitter compensation RF analog is a staircase waveform where the digital-to-analog converter sample rate and RF bandwidth sufficiently exceed the pulse sample rate. The phase noise of the digital-to-analog converters primarily shifts the timing of the transition between levels, and does not alter the level in the middle of each constant voltage step. The optical pulses then are modulated primarily by the middle of each constant voltage step, and hence see minimal digital-to-analog converter phase noise.

Figure 25:
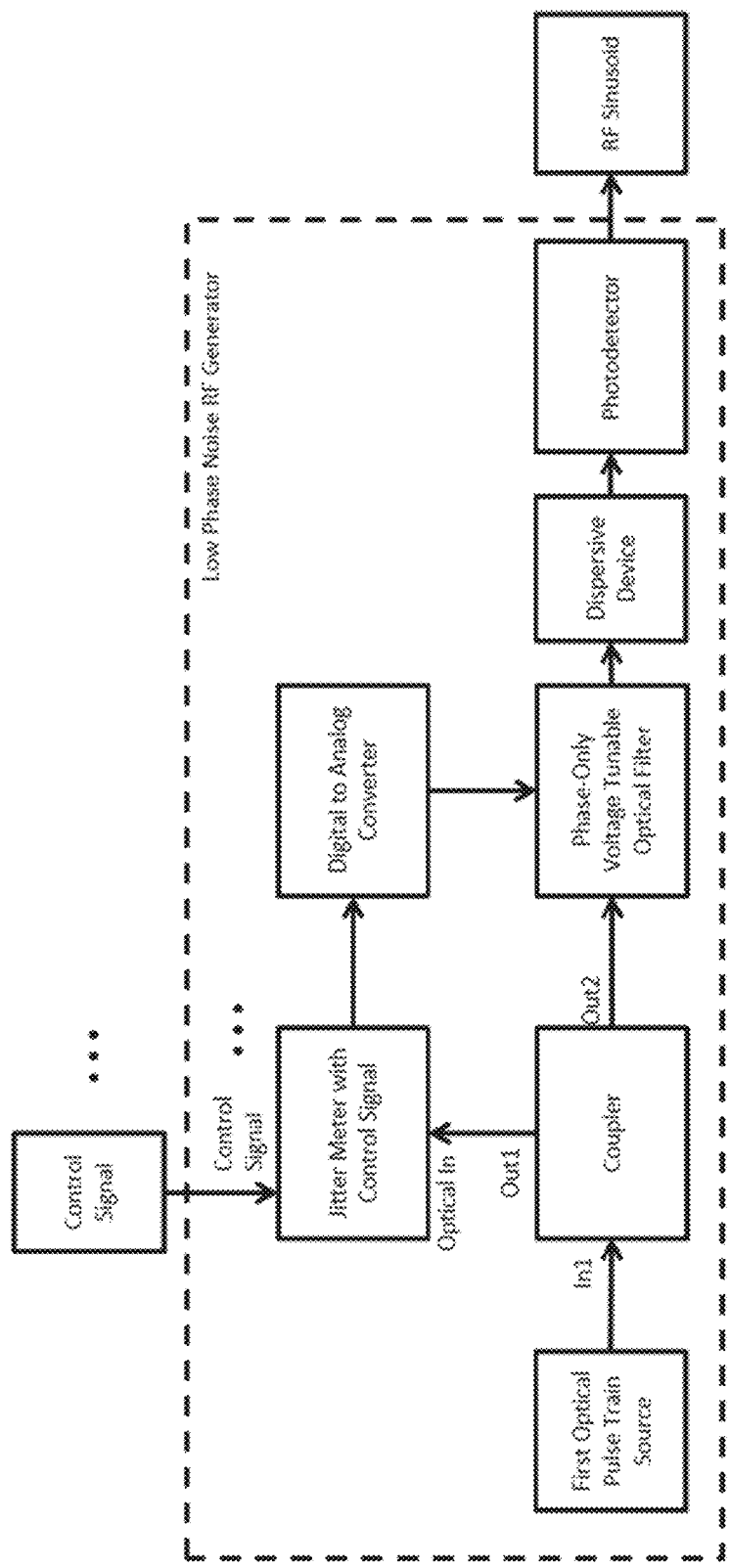
FIG. 25 is a block diagram representation of an example low-phase noise RF generator, in accordance with some embodiments of the disclosed technology.

The example embodiment illustrated in FIG. 25 adds agile tunability of the low phase noise RF sinusoid to the low phase noise RF oscillator of FIG. 24, thereby forming a low phase noise RF generator. This embodiment adds onto the digital jitter compensation signal a digital staircase signal which is wrapped and is subsequently turned into voltage levels in the electronic voltage level generator (digital-to-analog converter). The voltage levels are then fed into the VTOF of the photonic arbitrary passband signal generator as the phase control signals. The digital staircase signal is formed to impart an equal increment/decrement in phase to each subsequent pulse in the train, and the frequency shift is proportional to the pulse-by-pulse phase increment/decrement. The wrapping limits the signal to $2\pi$ a total range of phase imparted, so that the voltage levels created does not increase without limit, and yet still impart the right phase delay.

Figure 26:
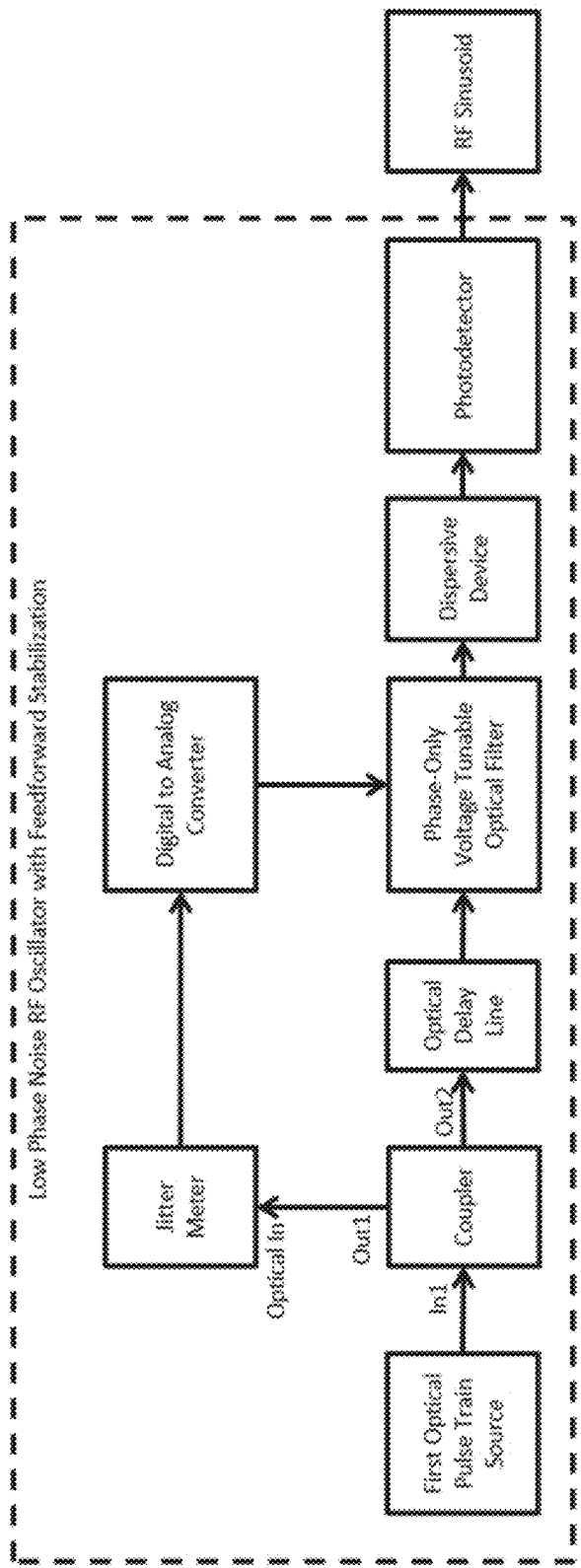
FIG. 26 is a block diagram representation of an example low-phase noise RF oscillator with feedforward stabilization, in accordance with some embodiments of the disclosed technology.
Figure 27:
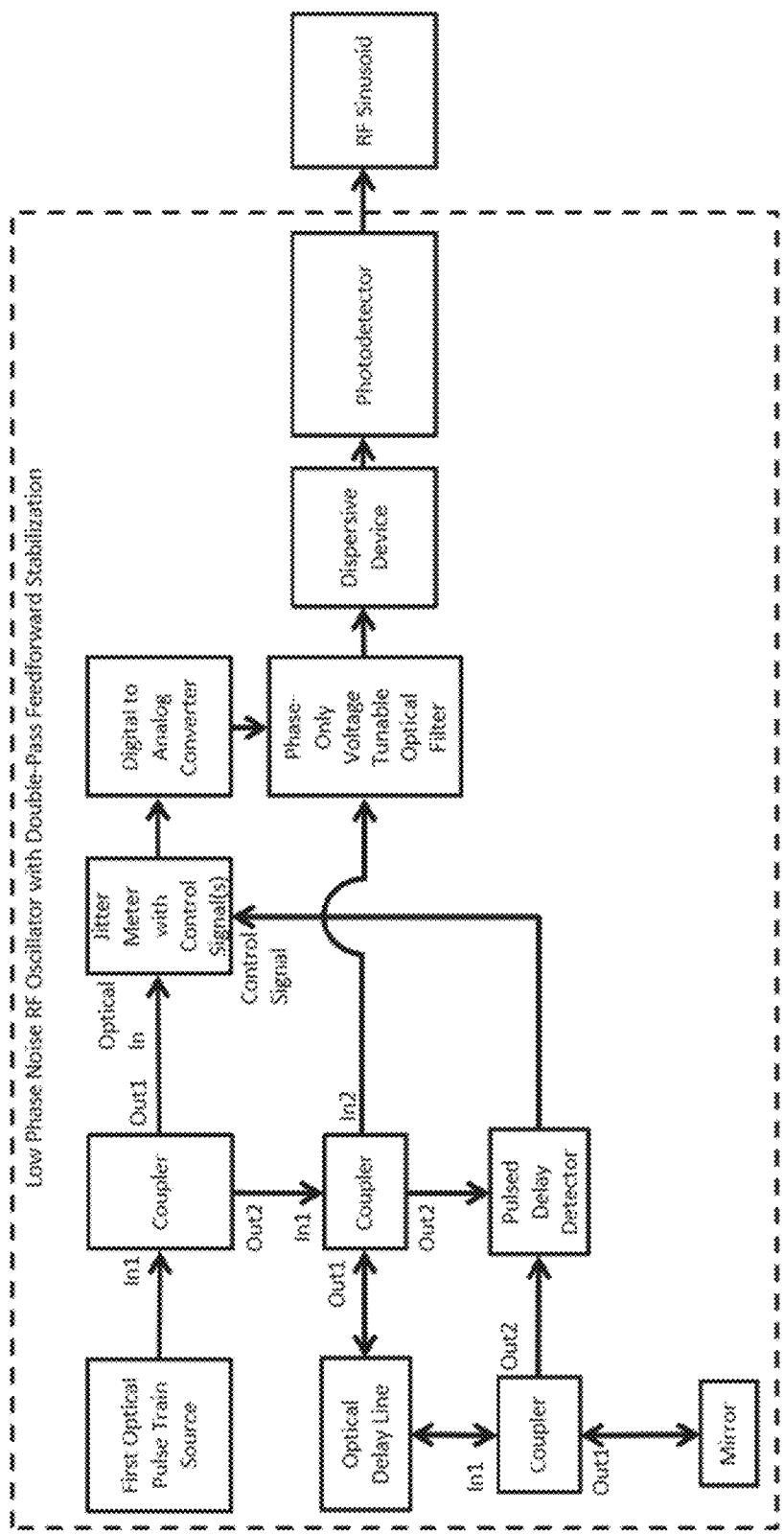
FIG. 27 is a block diagram representation of an example low-phase noise RF oscillator with double-pass feedforward stabilization, in accordance with some embodiments of the disclosed technology.
Figure 30:
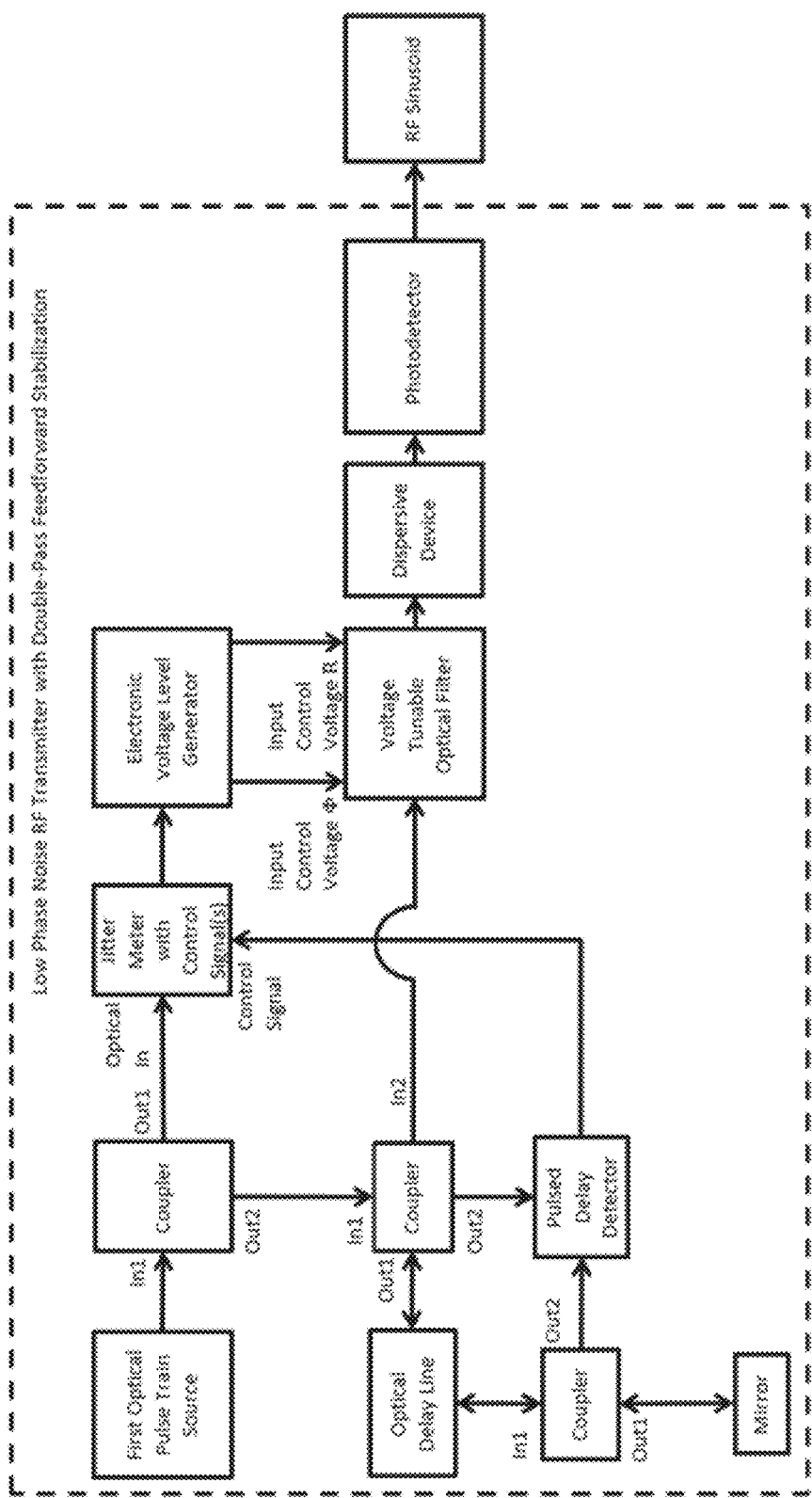
FIG. 30 is a block diagram representation of an example low-phase noise RF transmitter with double-pass feedforward stabilization, in accordance with some embodiments of the disclosed technology.

The example embodiment in FIG. 26 adds feedforward stabilization to the low phase noise RF oscillator of FIG. 24. This embodiment adds a second optical delay between the origin of the second optical wave (e.g., after the coupler) and the voltage tunable optical filter. This second optical delay line length is chosen to be longer than the time between when a pulse enters the jitter meter and when the RF jitter error signal reaches the voltage tunable optical filter. Also, the length of the feedforward can be stabilized either with a feedback mechanism that measures its length (e.g. separate laser, or thermally/vibrationally isolated box), or it can be digitally precompensated for, by (1) measuring the additional time delay drift it imparts after a single pass and (2) reflecting a copy of the signal backwards through the fiber, so that it undergoes twice the time delay drift, but the amount of time it takes to go through backwards gives time to the digital processor to send an additional compensatory signal that is negative of the double of the first pass time. That way, the jitter compensation signal would be matched to the copies of the original pulses from which the compensation signal was created. The example embodiments in FIG. 27 and FIG. 30 illustrate the double pass feedforward stabilization technique, which digitally precompensates for the feedforward length drift. In these feedforward stabilization techniques, the jitter error from each original pulse is used to the correct an optical copy of that original pulse. Unlike in feedback techniques, such feedforward techniques can compensate phase noise all the way up to the highest frequency offset, the Nyquist frequency.

Figure 28:
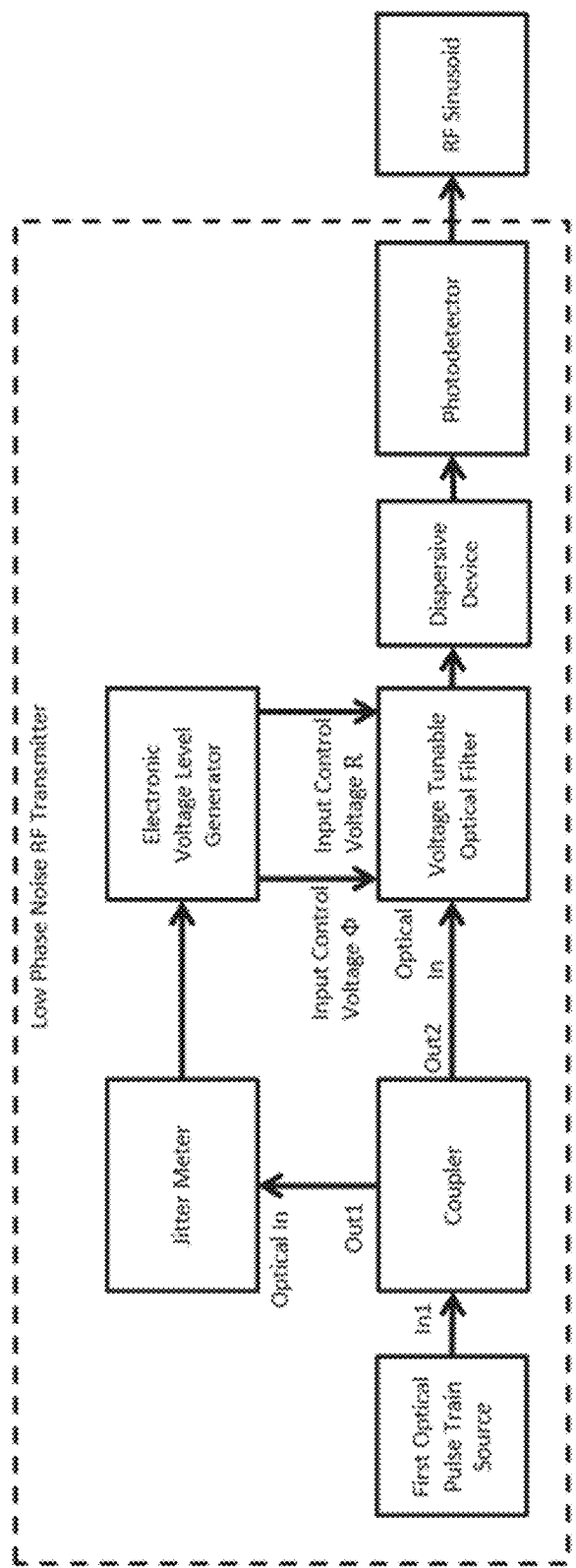
FIG. 28 is a block diagram representation of an example low-phase noise RF transmitter, in accordance with some embodiments of the disclosed technology.

The example embodiment illustrated in FIG. 28 adds the ability to modulate both the amplitude and phase of the optical pulse train of the low phase noise RF oscillator of FIG. 24, thereby forming a low phase noise RF transmitter. For example, the DAC in the embodiment in FIG. 24 is replaced by an electronic voltage level generator, which generates input control voltages "R" and "Φ" to control the amplitude and phase of the optical pulse train, respectively. In an example, the input control voltages are modified based on the output from the jitter meter to compensate for any measured timing errors in the optical pulse train prior to be being used to modulate the optical pulse train in the VTOF.

Figure 29:
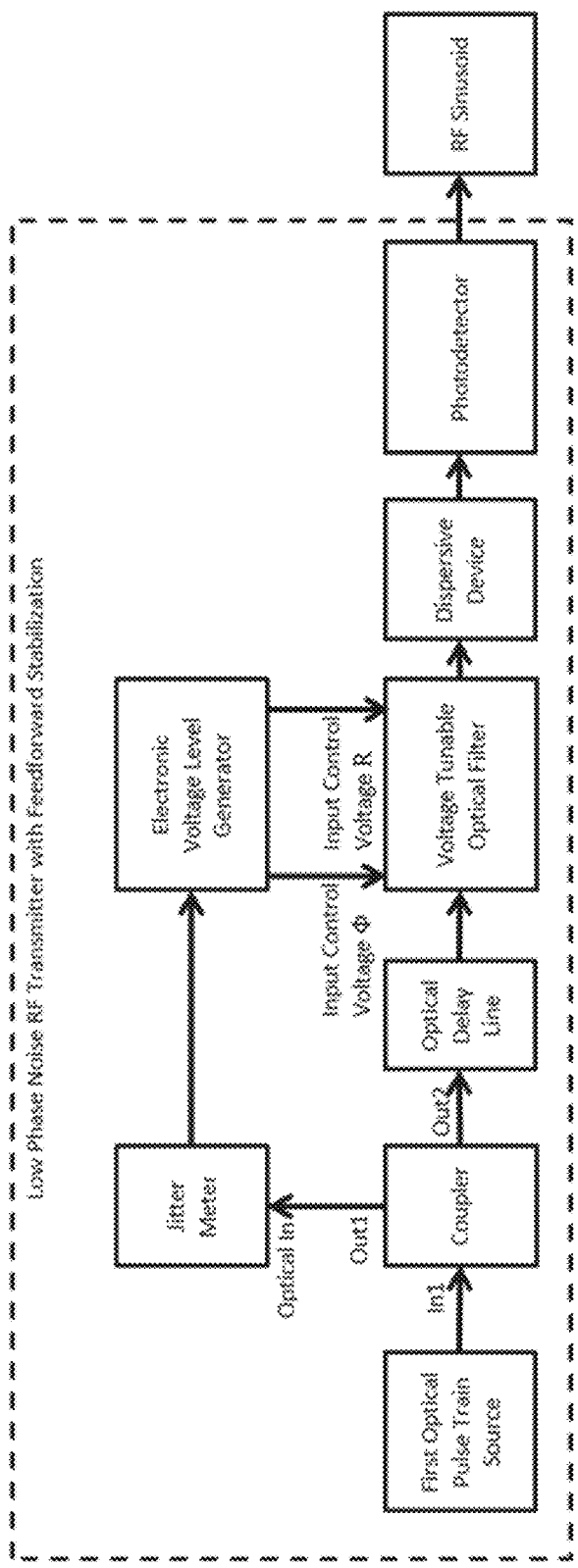
FIG. 29 is a block diagram representation of an example low-phase noise RF transmitter with feedforward stabilization, in accordance with some embodiments of the disclosed technology.

The example embodiment illustrated in FIG. 29 adds feedforward stabilization to the low phase noise RF transmitter of FIG. 28, similar to that described in the context of FIG. 26.

The example embodiment illustrated in FIG. 27 adds the double pass feedforward stabilization to the low phase noise RF oscillator of FIG. 24, which not only compensates noise up to Nyquist frequency but also digitally stabilizes the feedforward length. Similarly, the example embodiment illustrated in FIG. 30 adds the double pass feedforward stabilization to the low phase noise RF transmitter of FIG. 28.

Figure 31:
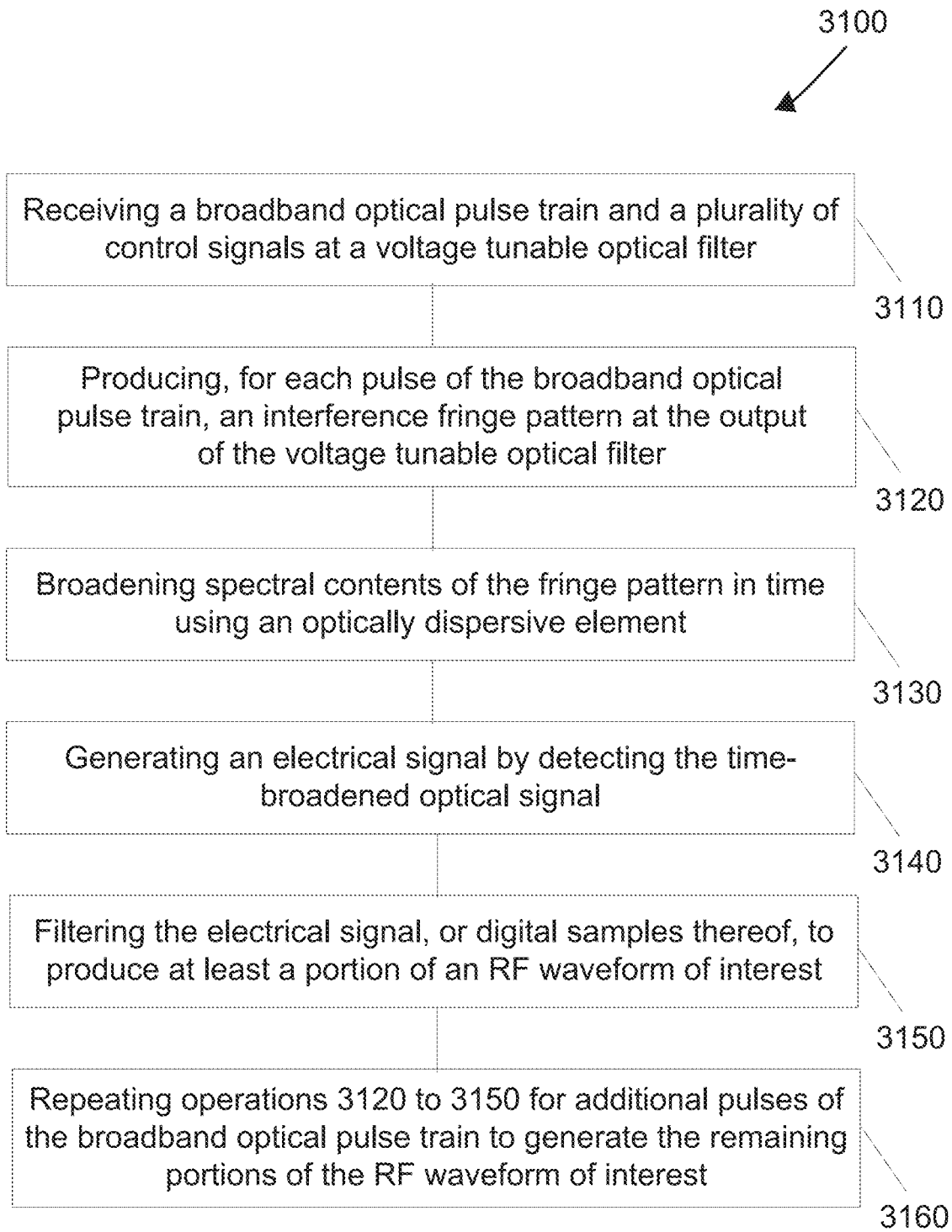
FIG. 31 illustrates a flowchart of an example method for generating passband signals using photonics.

FIG. 31 illustrates a flowchart of an example method for arbitrary radio frequency (RF) passband signal generation using photonics. The method 3100 includes, at operation 3110, receiving a broadband optical pulse train and a plurality of control signals at a voltage tunable optical filter (VTOF).

The method 3100 includes, at operation 3120, producing, for each pulse of the broadband optical pulse train, an interference fringe pattern at the output of the VTOF, wherein an extinction ratio of the fringe pattern is determined in accordance with a first of the plurality of control signals, and a shift of the fringe pattern is determined in accordance with the second of the plurality of control signals.

The method 3100 includes, at operation 3130, broadening spectral contents of the fringe pattern in time using an optically dispersive element.

The method 3100 includes, at operation 3140, generating an electrical signal by detecting the time-broadened optical signal.

The method 3100 includes, at operation 3150, filtering the electrical signal, or digital samples thereof, to produce at least a portion of an RF passband signal of interest.

The method 3100 includes, at operation 3160, repeating operations 3120 to 3150 for additional pulses of the broadband optical pulse train to generate the remaining portions of the RF passband signal of interest.

In some embodiments, the plurality of control signals includes three control signals, and the first of the plurality of control signals controls an amplitude adjustment, the second of the plurality of signals controls a fine frequency adjustment and the third of the plurality of control signals controls a coarse frequency adjustment of the RF passband signal of interest.

Embodiments of the disclosed technology provide a voltage tunable optical filter for use in a passband signal generator, comprising a first input configured to receive a broadband optical pulse train; a second input configured to receive a first control voltage representative of an amplitude signal; an electrooptic modulator coupled to the first input and to the second input to receive the broadband optical pulse train and the first control voltage, and to modulate the broadband optical pulse train in accordance with the amplitude signal, electrooptical modulator configured to produce two complementary optical outputs that form two arms of an interferometer; an optical delay component coupled to the electrooptic modulator to impart an optical path difference into one of the complementary outputs of the electrooptic modulator; and a combiner or a splitter to receive two complementary optical outputs of the electrooptic modulator after impartation of the optical path difference and to produce an output interference pattern of fringes, wherein an extinction ratio of the interference fringes is dependent on a value of the first control voltage.

In some embodiments, the voltage tunable optical filter is implemented as part of an arbitrary radio frequency (RF) passband signal generator, the arbitrary RF passband signal generator, further comprising a dispersive element, coupled to an output of the voltage tunable optical filter, to map a broadband optical output of the voltage tunable optical filter to a time-broadened optical signal.

In some embodiments, the voltage tunable optical filter further comprises an optical-to-electrical converter, coupled to the dispersive element, to convert the time-broadened optical signal to an analog electrical signal; and a bandpass filter, coupled to the optical-to-electrical converter, to receive and interpolate the analog electrical signal.

In some embodiments, the optical-to-electrical converter comprises a balanced photodetector.

In some embodiments, the electrooptic modulator is an electrooptic amplitude modulator, and the voltage tunable optical filter further comprises a third input configured to receive a second control voltage; and an electrooptic phase modulator coupled to the electrooptic amplitude modulator to vary a phase of the broadband optical pulse train based on the second control voltage, wherein a shift of the interference fringes is dependent on a value of the second control voltage.

In some embodiments, the voltage tunable optical filter includes an unbalanced Mach-Zehnder interferometer.

In some embodiments, the electrooptic modulator is a first electrooptic phase modulator, and the voltage tunable optical filter further comprises a third input configured to receive a second control voltage; a first polarization rotator coupled between the first input and the first electrooptic phase modulator; a second polarization rotator positioned to rotate a polarization of the output optical signal from the first electrooptic phase modulator; and a second electrooptic phase modulator coupled to the output of the second polarization rotator and to the second control to vary a phase of the broadband optical pulse train based on the second control voltage, wherein a shift of the interference fringes is dependent on a value of the second control voltage.

In some embodiments, the voltage tunable optical filter further comprises a third polarization rotator and a polarization beam splitter, wherein the optical delay component is coupled to the output of the second electrooptic phase modulator, the third polarization rotator is coupled to the output of the optical delay component, and the polarization beam splitter is coupled to the output of the third polarization rotator.

In some embodiments, the voltage tunable optical filter includes a single fiber or waveguide that is used for implementation of the both arms of the interferometer on the single fiber or waveguide.

In some embodiments, the voltage tunable optical filter comprises another input configured to receive a third control voltage to control a delay of the optical delay component.

In some embodiments, the voltage tunable optical filter further comprises an optical source, coupled to the voltage tunable optical filter, to generate the broadband optical pulse train characterized by at least a pulse rate.

In some embodiments, the voltage tunable optical filter (VTOF) is implemented as a first VTOF of an arbitrary radio frequency (RF) passband signal generator, the arbitrary RF passband signal generator comprising an input optical splitter positioned to receive input laser pulses at a first repetition rate and to produce a plurality secondary laser pulses (which may have the same repetition rate as the first repetition rate) that are different in one or both of a power or a spectral content compared to the input laser pulses; one or more additional voltage tunable optical filters (VTOFs), each of the one or more additional VTOFs being substantially similar to the first VTOF, each VTOF configured to receive one of the secondary laser pulses, and each VTOF further configured to receive one or more control voltages to effect modulation of a corresponding secondary laser pulse; a plurality of optical delay elements, each coupled to an output of a corresponding VTOF; an optical coupler configured to receive optical signals from each of the optical delay elements and to combine the received optical signals into a time-multiplexed series of modulated secondary laser pulses to form a composite pulse train having a higher repetition rate than the first repetition rate; and a dispersion element coupled to the output of the optical coupler to broaden spectral contents of the time-multiplexed series of modulated secondary laser pulses in time.

In some embodiments, the voltage tunable optical filter (VTOF) is implemented as a first VTOF of an arbitrary radio frequency (RF) passband signal generator, the arbitrary RF passband signal generator comprising an input optical splitter to receive a first series input laser pulses and to produce a plurality secondary laser pulses that are different in one or both of a power or a spectral content compared to the first series of input laser pulses; one or more additional voltage tunable optical filters (VTOFs), each of the one or more additional VTOFs being substantially similar to the first VTOF, each VTOF configured to receive one of the secondary laser pulses, and each VTOF further configured to receive one or more control voltages to effect modulation of a corresponding secondary laser pulse; a plurality of optical dispersive elements, each coupled to an output of a corresponding VTOF; and one or more detectors and one or more RF filters to receive the optical outputs from each of the dispersive elements and to generate a plurality of synchronized RF signals.

In some embodiments, the dispersive element comprises one or more dispersion compensation fibers.

In some embodiments, the voltage tunable optical filter (VTOF) is implemented as part of an arbitrary radio frequency (RF) passband signal generator, the arbitrary RF passband signal generator, the system comprising an optical filter comprising an optical modulator and a static optical spectral shaping filter, wherein a filtering operation of the optical filter compensates for inter-symbol interference due to at least one component of the optical-to-electrical converter and/or the bandpass filter, and wherein the static optical spectral shaping filter is based on one or more transfer functions of the at least one component of the optical-to-electrical converter and/or the bandpass filter.

In some embodiments, the optical filter is coupled to the broadband pulse train to perform a filtering operation on the broadband optical pulse train.

In some embodiments, the optical filter is coupled to an output of the voltage tunable optical filter or an output of the dispersive element, and configured to perform a filtering operation on an output thereof.

Embodiments of the disclosed technology provide an apparatus for generating an arbitrary radio frequency (RF) passband signal, comprising a plurality of cascaded electrooptic modulators; a plurality of digital-to-analog converters (DACs), each DAC independently driving a corresponding one of the plurality of cascaded electrooptic modulators; a first of the plurality of cascaded electrooptic modulators to receive an input optical pulse train and vary a phase of the input optical pulse train based on a voltage signal from a first DAC of the plurality of DACs; and a second and subsequent of the plurality of cascaded electrooptic modulators configured to receive a modified optical pulse train from a previous of the plurality of cascaded electrooptic modulators and vary a phase or an amplitude of the received modified optical pulse train based on the voltage level from a second and subsequent DAC of the plurality of DACs, respectively, wherein driving each of the plurality of cascaded electrooptic modulators independently using each of the plurality of DACs suppresses the thermal noise in a generation of the arbitrary RF passband signal.

Embodiments of the disclosed technology provide an apparatus for generating an arbitrary radio frequency (RF) passband signal, comprising an electrooptic modulator having multiple sets of electrodes coupled to different sections of the electrooptic modulator; a plurality of digital-to-analog converters (DACs), each DAC driving a corresponding one the multiple sets of electrodes; and the electrooptic modulator configured to receive an input optical pulse train and vary a phase or an amplitude of the input optical pulse train based on a voltage signal from each of the plurality of DACs as the input optical pulse train propagates through the different sections of the electrooptic modulator.

Embodiments of the disclosed technology provide a system for generating a plurality of synchronized radio frequency (RF) passband signals, comprising: a voltage tunable optical filter, comprising a first input to receive a broadband optical pulse train, two or more additional inputs to receive a plurality of control voltages, and an output, wherein the voltage tunable optical filter is configured to produce an interference fringe pattern at the output, wherein an extinction ratio of the fringe pattern is determined in accordance with a first of the plurality of control voltages, and a shift of the fringe pattern is determined in accordance with a second of the plurality of control voltages; a dispersive element, coupled to the output of the voltage tunable optical filter, to broaden spectral contents of the fringe pattern in time; and an optical-to-electrical converter, coupled to an output of the dispersive element, to detect a time-broadened optical signal produced by the dispersive element and generate an electrical signal based thereon.

In some embodiments, the system further comprises an optical coupler configured to receive and split the broadband optical pulse train into two signals, each comprising the broadband optical pulse train; and a timing measurement device coupled to the optical coupler to receive one of the two signals, measure a timing error in the broadband optical pulse train, compute an error voltage based on the timing error, and add the error voltage to the second of the plurality of control voltages.

Implementations of the subject matter and the functional operations described in this patent document can be implemented in various systems, optical components, digital electronic circuitry, or in computer software, firmware, or hardware, including the structures disclosed in this specification and their structural equivalents, or in combinations of one or more of them.

Part of the disclosed subject matter in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A voltage tunable optical filter for use in a passband signal generator, comprising:
    a first input configured to receive a broadband optical pulse train;
    a second input configured to receive a first control voltage representative of an amplitude signal;
    an electrooptic modulator coupled to the first input and to the second input to receive the broadband optical pulse train and the first control voltage, and to modulate the broadband optical pulse train in accordance with the amplitude signal, the electrooptic modulator configured to produce two complementary optical outputs that form two arms of an interferometer;
    an optical delay component coupled to the electrooptic modulator to impart an optical path difference into one of the complementary outputs of the electrooptic modulator; and
    a combiner to receive two complementary optical outputs of the electrooptic modulator after impartation of the optical path difference and to produce an output interference pattern of fringes, wherein an extinction ratio of the interference fringes is dependent on a value of the first control voltage.

2. The voltage tunable optical filter of claim 1, wherein the voltage tunable optical filter is implemented as part of an arbitrary radio frequency (RF) passband signal generator, the arbitrary RF passband signal generator, further comprising:

a dispersive element, coupled to an output of the voltage tunable optical filter, to map a broadband optical output of the voltage tunable optical filter to a time-broadened optical signal.

3. The voltage tunable optical filter of claim 2, further comprising:
an optical-to-electrical converter, coupled to the dispersive element, to convert the time-broadened optical signal to an analog electrical signal; and
a bandpass filter, coupled to the optical-to-electrical converter, to receive and interpolate the analog electrical signal.

4. The voltage tunable optical filter of claim 3, wherein the optical-to-electrical converter comprises a balanced photodetector.

5. The voltage tunable optical filter of claim 3, wherein the voltage tunable optical filter (VTOF) is implemented as part of an arbitrary radio frequency (RF) passband signal generator, the arbitrary RF passband signal generator, comprising:
an optical filter comprising an optical modulator and a static optical spectral shaping filter, wherein a filtering operation of the optical filter compensates for inter-symbol interference due to at least one component of the optical-to-electrical converter and/or the bandpass filter, and wherein the static optical spectral shaping filter is based on one or more transfer functions of the at least one component of the optical-to-electrical converter and/or the bandpass filter.

6. The system of claim 5, wherein the optical filter is coupled to the broadband pulse train to perform a filtering operation on the broadband optical pulse train.

7. The system of claim 5, wherein the optical filter is coupled to an output of the voltage tunable optical filter or an output of the dispersive element, and configured to perform a filtering operation on an output thereof.

8. The voltage tunable optical filter of claim 2, wherein the dispersive element comprises one or more dispersion compensation fibers.

9. The voltage tunable optical filter of claim 1, wherein the electrooptic modulator is an electrooptic amplitude modulator, and the voltage tunable optical filter further comprises:
a third input configured to receive a second control voltage; and
an electrooptic phase modulator coupled to the electrooptic amplitude modulator to vary a phase of the broadband optical pulse train based on the second control voltage, wherein a shift of the interference fringes is dependent on a value of the second control voltage.

10. The voltage tunable optical filter of claim 1, wherein the voltage tunable optical filter includes an unbalanced Mach-Zehnder interferometer.

11. The voltage tunable optical filter of claim 1, wherein the electrooptic modulator is a first electrooptic phase modulator, and the voltage tunable optical filter comprises:
a third input configured to receive a second control voltage;
a first polarization rotator coupled between the first input and the first electrooptic phase modulator;
a second polarization rotator positioned to rotate a polarization of the output optical signal from the first electrooptic phase modulator;
a second electrooptic phase modulator coupled to the output of the second polarization rotator and to the second control voltage to vary a phase of the broadband optical pulse train based on the second control voltage, wherein a shift of the interference fringes is dependent on a value of the second control voltage; and
wherein the combiner includes:
a third polarization rotator; and
a polarization beam splitter, and wherein the optical delay component is coupled to the output of the second electrooptic phase modulator, the third polarization rotator is coupled to the output of the optical delay component, and the polarization beam splitter is coupled to the output of the third polarization rotator.

12. The voltage tunable optical filter of claim 1, wherein the voltage tunable optical filter includes a single fiber or waveguide that is used for implementation of the both arms of the interferometer on the single fiber or waveguide.

13. The voltage tunable optical filter of claim 1, wherein the voltage tunable optical filter comprises another input configured to receive a third control voltage to control a delay of the optical delay component.

14. The voltage tunable optical filter of claim 1, further comprising:
an optical source, coupled to the voltage tunable optical filter, to generate the broadband optical pulse train characterized by at least a pulse rate.

15. The voltage tunable optical filter of claim 1, wherein the voltage tunable optical filter (VTOF) is implemented as a first VTOF of an arbitrary radio frequency (RF) passband signal generator, the arbitrary RF passband signal generator comprising:
an input optical splitter positioned to receive input laser pulses at a first repetition rate and to produce a plurality secondary laser pulses that are different in one or both of a power or a spectral content compared to the input laser pulses;
one or more additional voltage tunable optical filters (VTOFs), each of the one or more additional VTOFs being substantially similar to the first VTOF, each VTOF configured to receive one of the secondary laser pulses, and each VTOF further configured to receive one or more control voltages to effect modulation of a corresponding secondary laser pulse;
a plurality of optical delay elements, each coupled to an output of a corresponding VTOF;
an optical coupler configured to receive optical signals from each of the optical delay elements and to combine the received optical signals into a time-multiplexed series of modulated secondary laser pulses; and
a dispersion element coupled to the output of the optical coupler to broaden spectral contents of the time-multiplexed series of modulated secondary laser pulses in time.

16. The voltage tunable optical filter of claim 1, wherein the voltage tunable optical filter (VTOF) is implemented as a first VTOF of an arbitrary radio frequency (RF) passband signal generator, the arbitrary RF passband signal generator comprising:
an input optical splitter to receive a first series input laser pulses and to produce a plurality secondary laser pulses that are different in one or both of a power or a spectral content compared to the first series of input laser pulses;
one or more additional voltage tunable optical filters (VTOFs), each of the one or more additional VTOFs being substantially similar to the first VTOF, each VTOF configured to receive one of the secondary laser pulses, and each VTOF further configured to receive one or more control voltages to effect modulation of a corresponding secondary laser pulse;

a plurality of optical dispersive elements, each coupled to an output of a corresponding VTOF; and one or more detectors and one or more RF filters to receive the optical outputs from each of the dispersive elements and to generate a plurality of synchronized RF signals.

17. The voltage tunable optical filter of claim 1, wherein the combiner includes a beam splitter.

18. A method for generating an arbitrary radio frequency (RF) passband signal, comprising:
   (a) receiving a broadband optical pulse train and a plurality of control signals at a voltage tunable optical filter (VTOF);
   (b) for each pulse of the broadband optical pulse train, producing an interference fringe pattern at the output of the VTOF, wherein an extinction ratio of the fringe pattern is determined in accordance with a first of the plurality of control signals, and a shift of the fringe pattern is determined in accordance with the second of the plurality of control signals;
   (c) broadening spectral contents of the fringe pattern in time using an optically dispersive element;
   (d) generating an electrical signal by detecting the time-broadened optical signal;
   (e) filtering the electrical signal, or digital samples thereof, to produce at least a portion of an RF passband signal of interest; and
   repeating operations (b) to (e) for additional pulses of the broadband optical pulse train to generate the remaining portions of the RF passband signal of interest.

19. The method of claim 18, wherein the plurality of control signals includes three control signals, and wherein:
   the first of the plurality of control signals controls an amplitude adjustment, a second of the plurality of control signals controls a fine frequency adjustment and a third of the plurality of control signals controls a coarse frequency adjustment of the RF passband signal of interest.

20. A system for generating a plurality of synchronized radio frequency (RF) passband signals, comprising:
   a voltage tunable optical filter, comprising:
      a first input to receive a broadband optical pulse train,
      two or more additional inputs to receive a plurality of control voltages, and an output,
      wherein the voltage tunable optical filter is configured to produce an interference fringe pattern at the output, wherein an extinction ratio of the fringe pattern is determined in accordance with a first of the plurality of control voltages, and a shift of the fringe pattern is determined in accordance with a second of the plurality of control voltages;
   a dispersive element, coupled to the output of the voltage tunable optical filter, to broaden spectral contents of the fringe pattern in time; and
   an optical-to-electrical converter, coupled to an output of the dispersive element, to detect a time-broadened optical signal produced by the dispersive element and generate an electrical signal based thereon.

21. The system of claim 20, further comprising:
   an optical coupler configured to receive and split the broadband optical pulse train into two signals, each comprising the broadband optical pulse train; and
   a timing measurement device coupled to the optical coupler to receive one of the two signals, measure a timing error in the broadband optical pulse train, compute an error voltage based on the timing error, and add the error voltage to the second of the plurality of control voltages.

* * * * *